(12) United States Patent
Matosevich et al.

(10) Patent No.: US 11,733,874 B2
(45) Date of Patent: Aug. 22, 2023

(54) MANAGING REPLICATION JOURNAL IN A DISTRIBUTED REPLICATION SYSTEM

(71) Applicant: EMC IP Holding Company LLC, Hopkinton, MA (US)

(72) Inventors: Rivka Matosevich, Zichron Ya'acov (IL); Roman Spiegelman, Yokneam Illit (IL); German Goft, Pardess Hanna Karkur (IL); Lior Zilpa, Holon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 158 days.

(21) Appl. No.: 17/306,601

(22) Filed: May 3, 2021

(65) Prior Publication Data
US 2022/0350497 A1    Nov. 3, 2022

(51) Int. Cl.
*G06F 3/06* (2006.01)
*G06F 16/18* (2019.01)

(52) U.S. Cl.
CPC ............ *G06F 3/0619* (2013.01); *G06F 3/065* (2013.01); *G06F 3/0608* (2013.01); *G06F 3/0634* (2013.01); *G06F 3/0641* (2013.01); *G06F 3/0683* (2013.01); *G06F 16/1815* (2019.01)

(58) Field of Classification Search
CPC .... G06F 3/0619; G06F 3/0608; G06F 3/0634; G06F 3/0641; G06F 3/065; G06F 3/0683; G06F 16/1815
See application file for complete search history.

(56) References Cited

U.S. PATENT DOCUMENTS 5,381,539 A    1/1995    Yanai et al.
5,551,003 A    8/1996    Mattson et al.
(Continued)

FOREIGN PATENT DOCUMENTS

WO    PCT/US2019/024885    1/2020
WO    PCT/US2019/024900    1/2020
(Continued)

OTHER PUBLICATIONS

Dell EMC, "Dell EMC VxRack FLEX," Dell EMC Product Overview, 2018, 5 pages.
(Continued)

*Primary Examiner* — Jason W Blust
(74) *Attorney, Agent, or Firm* — Ryan, Mason & Lewis, LLP

(57) ABSTRACT

Techniques are provided for managing replication journals in a distributed replication system. A data replication system assigns an associated replication journal volume to each replication component operating on a storage node. Each replication component is configured to handle a portion of a replication workload which is distributed among the replication components, and to write journal data in the associated replication journal volume of the replication component. The data replication system performs a recovery process in response to detecting a failed replication component. The recovery process includes designating at least one replication component as a recovery replication component, designating the associated replication journal volume of the failed replication component as a recovery journal volume, and assigning the recovery journal volume to the recovery replication component to enable the recovery replication component to recover journal data in the recovery journal volume.

20 Claims, 9 Drawing Sheets

(56) References Cited

U.S. PATENT DOCUMENTS

| | | | |
|---|---|---|---|
| 5,764,880 | A | 6/1998 | Gerdt et al. |
| 6,052,799 | A | 4/2000 | Li et al. |
| 6,941,420 | B2 | 9/2005 | Butterworth et al. |
| 8,843,676 | B2 | 9/2014 | Rajamanickam et al. |
| 9,063,994 | B1* | 6/2015 | Natanzon ............ G06F 11/2058 |
| 9,372,751 | B2 | 6/2016 | McNutt |
| 9,514,014 | B2 | 12/2016 | Webman et al. |
| 9,892,045 | B1 | 2/2018 | Douglis et al. |
| 10,078,598 | B1 | 9/2018 | Wallace et al. |
| 10,331,561 | B1 | 6/2019 | Shilane et al. |
| 10,346,237 | B1* | 7/2019 | Surendra Rao ....... G06F 11/079 |
| 10,445,180 | B2 | 10/2019 | Butterworth et al. |
| 2002/0032835 | A1 | 3/2002 | Li et al. |
| 2008/0021853 | A1 | 1/2008 | Modha et al. |
| 2009/0204761 | A1 | 8/2009 | Caprioli et al. |
| 2009/0276593 | A1 | 11/2009 | Jacobson et al. |
| 2012/0072689 | A1* | 3/2012 | Kempen ................. G06F 3/067 711/E12.103 |
| 2013/0305002 | A1 | 11/2013 | Hallak et al. |
| 2014/0195847 | A1* | 7/2014 | Webman ................ G06F 3/067 714/6.22 |
| 2014/0244935 | A1 | 8/2014 | Ezra et al. |
| 2016/0103764 | A1 | 4/2016 | Banerjee et al. |
| 2016/0364158 | A1* | 12/2016 | Narayanan ............. G06F 11/00 |
| 2018/0113640 | A1 | 4/2018 | Fernandez et al. |
| 2018/0267893 | A1 | 9/2018 | Barzik et al. |
| 2018/0300075 | A1 | 10/2018 | Fernandez et al. |
| 2019/0227845 | A1 | 7/2019 | Sridhar et al. |

FOREIGN PATENT DOCUMENTS

| | | |
|---|---|---|
| WO | 2020204880 A1 | 10/2020 |
| WO | 2020204882 A1 | 10/2020 |

OTHER PUBLICATIONS

G. Soundararajan et al., "Dynamic Resource Allocation for Database Servers Running on Virtual Storage," FAST 2009: Proceedings of the 7th conference on File and storage technologies, Feb. 2009, pp. 71-84.
Dell EMC, "EMC ScaleIO Basic Architecture Documentation," Technical White Paper, Mar. 2017, 22 pages.
EMC2, "EMC ScaleIO Design Considerations and Best Practices," Technical White Paper, Jun. 2016, 30 pages.
I. Koltsidas et al., "SoftwAre Log-Structured Array (SALSA)—A Unified Stack for SSDs and SMR Disks," IBM Research Report, Dec. 2, 2015, 13 pages.
S. M. Rumble et al., "Log-Structured Memory for DRAM-Based Storage," Proceedings of the 12th USENIX Conference on File and Storage Technologies, Santa Clara, CA, Feb. 17-20, 2014, 17 pages.
Dell EMC, "Dell EMC VxFlex Family Overview," Technical White Paper, May 2019, 44 pages.
J. Nakano et al., "ReViveI/O: Efficient Handling of I/O in Highly-Available Rollback-Recovery Servers," HPCA, 10.1109/2006. 1598129, pp. 200-211.
Wikipedia, "Raft (Computer Science)," https://en.wikipedia.org/wiki/Raft_(computer_science), Feb. 10, 2020, 4 pages.
Wikipedia, "Paxos (Computer Science)," https://en.wikipedia.org/wiki/Paxos_(computer_science), Dec. 6, 2019, 21 pages.
Wikipedia, "State Machine Replication," https://en.wikipedia.org/wiki/State_machine_replication, Dec. 14, 2019, 9 pages.
Dell Technologies, "Dell EMC PowerFlex: Secure Snapshots," Technical White Paper, Jul. 2020, 17 pages.
Dell Technologies, "Dell EMC PowerFlex: Protected Maintenance Mode," Technical White Paper, Jul. 2020, 20 pages.
Dell Technologies, "Dell EMC PowerFlex: Introduction to Replication," Technical White Paper, Jun. 2020, 34 pages.
Dell Technologies, "Dell EMC PowerFlex: Networking Best Practices and Design Considerations," Best Practices, Jun. 2020, 64 pages.
Dell EMC, "Getting to Know Dell EMC PowerFlex—Version 3.5.x," Dell EMC, Jan. 2021, 66 pages, Revision 2.
U.S. Appl. No. 16/807,709 filed in the name of Avi Puder et al. Mar. 3, 2020, and entitled "Management of Shared Resources in a Software-Defined Storage Environment."
U.S. Appl. No. 16/822,818 filed in the name of Itay Keller et al. Mar. 18, 2020, and entitled "Storage System Implementing Snapshot Longevity Ranking for Efficient Management of Snapshots."
U.S. Appl. No. 16/822,848 filed in the name of Itay Keller et al. Mar. 18, 2020, and entitled "Assignment of Longevity Ranking Values of Storage Volume Snapshots Based on Snapshot Policies."
U.S. Appl. No. 16/823,813 filed in the name of Itay Keller et al. Mar. 19, 2020, and entitled "Managing Incompressible Data in a Compression-Enabled Log-Structured Array Storage System."
U.S. Appl. No. 16/830,469 filed in the name of Roi Tagar et al. Mar. 26, 2020, and entitled "Storage Block Balancing Using Volume Part Migration."
U.S. Appl. No. 16/830,473 filed in the name of Yugal Peleg Lieblich et al. Mar. 26, 2020, and entitled "Replicated State Cluster with Standby Node State Assessment During Leadership Transition."
U.S. Appl. No. 16/830,946 filed in the name of Gil Ben Zeev et al. Mar. 26, 2020, and entitled "Storage Volume Migration Scheduling Based on Storage Volume Priorities and Specified Constraints."
U.S. Appl. No. 16/832,763 filed in the name of Michal Yarimi et al. Mar. 27, 2020, and entitled "Managing Storage Device Errors During Processing of Inflight Input/Output Requests."
U.S. Appl. No. 16/834,363 filed in the name of Itay Keller et al. Mar. 30, 2020, and entitled "Managing Least Recently Used Cache Using Reduced Memory Footprint Sequence Container."
U.S. Appl. No. 16/836,824 filed in the name of Itay Keller et al. Mar. 31, 2020, and entitled "Management of Volume Snapshots in a Data Storage System."
U.S. Appl. No. 16/888,742 filed in the name of Rivka Matosevich et al. May 31, 2020, and entitled "Balancing Resiliency and Performance by Selective Use of Degraded Writes and Spare Capacity in Storage Systems."
U.S. Appl. No. 16/918,654 filed in the name of Rivka Matosevich et al. Jul. 1, 2020, and entitled "Sharing Memory Resources Between Asynchronous Replication Workloads."
U.S. Appl. No. 16/983,423 filed in the name of Dan Aharoni et al. Aug. 3, 2020, and entitled "Deferred Reclamation of Invalidated Entries that are Associated with a Transaction Log in a Log-Structured Array."
U.S. Appl. No. 17/024,912 filed in the name of Anurag Sharma et al. Sep. 18, 2020, and entitled "Automatic Discovery and Configuration of Server Nodes."
U.S. Appl. No. 17/065,754 filed in the name of Dan Aharoni et al. Oct. 8, 2020, and entitled "Direct Response to IO Request in Storage System with Remote Replication."
U.S. Appl. No. 17/070,073 filed in the name of Dan Aharoni et al. Oct. 14, 2020, and entitled "Direct Response to IO Request in Storage System Having an Intermediary Target Apparatus."
U.S. Appl. No. 17/070,288 filed in the name of Anurag Sharma et al. Oct. 14, 2020, and entitled "Pipeline-Based System for Configuration Checking and Reporting Associated with an Information Processing System."
U.S. Appl. No. 17/071,407 filed in the name of John Moran et al. Oct. 15, 2020, and entitled "Dynamic Remediation Actions in Response to Configuration Checks in an Information Processing System."
U.S. Appl. No. 17/077,105 filed in the name of Yosef Shatsky et al. Oct. 22, 2020, and entitled "Volume Tiering in Storage Systems."
U.S. Appl. No. 17/106,988 filed in the name of Rivka Matosevich et al. Nov. 30, 2020, and entitled "Managing Host Connectivity to a Data Storage System."
U.S. Appl. No. 17/123,525 filed in the name of Itay Keller et al. Dec. 16, 2020, and entitled "Deferred Reclamation of Invalidated Entries Associated qith Replication in a Log-Structured Array."
U.S. Appl. No. 17/145,646 filed in the name of Yosef Shatsky et al. Jan. 11, 2021, and entitled "Redistribution of Processing Groups between Server Nodes Based on Hardware Resource Utilization."

* cited by examiner

MANAGING REPLICATION JOURNAL IN A DISTRIBUTED REPLICATION SYSTEM

TECHNICAL FIELD

This disclosure relates generally to data storage management and, more particularly, to data replication techniques in a data storage system.

BACKGROUND

Network computing systems, such as distributed data storage systems, typically implement data protection and disaster recovery techniques to protect against loss of critical system and application data. For example, data replication is one type of data protection technique that can be utilized to support disaster recovery. In general, data replication involves storing primary data (e.g., production data) at a primary site and storing a copy of the primary data at one or more remote sites to maintain one or more replicas of the primary data. There are two types of data replication techniques which depend on whether replication of the primary data is performed synchronously or asynchronously. In particular, synchronous replication generally involves writing data to both a source (primary) volume and a destination (replica) volume before acknowledging completion of an input/output (I/O) write operation to a host application. In this regard, synchronous replication is utilized for applications which require the primary data and the replica data to remain synchronized in real-time to provide high availability of critical systems or applications. In the event of a failure at the primary site, applications can failover to a remote site and resume operation with an assurance of zero data loss.

On the other hand, asynchronous replication generally involves writing data to the source volume, and acknowledging completion of the I/O write operation to the host application before the data is replicated to the destination volume. With asynchronous replication, the I/O write operations at the source site are logged in a replication journal by a replication component at the source site, and the replication journal is periodically transmitted at scheduled times to a destination site in which a replication component at the destination site processes the received replication journal to replicate the data to the destination volume. When a given replication component on a source site or destination site fails, a recovery process should be implemented to enable recovery of a replication journal and to allow the data replication system to continue to operate and process replication I/O requests.

SUMMARY

Exemplary embodiments of the disclosure include techniques for managing replication journals in a distributed replication system. For example, an exemplary embodiment includes a method that is implemented by a data replication system. The data replication system assigns an associated replication journal volume to each replication component of a plurality of replication components operating on a storage node of a data storage system. Each replication component is configured to (i) handle a portion of a replication workload which is distributed among the plurality of replication components, and to (ii) write journal data in the associated replication journal volume of the replication component, wherein the journal data is utilized to perform data replication. The data replication system performs a recovery process in response to detecting a failed replication component of the plurality of replication components. The recovery process comprises designating at least one replication component of the plurality of replication components as a recovery replication component, designating the associated replication journal volume of the failed replication component as a recovery journal volume, and assigning the recovery journal volume to the recovery replication component to enable the recovery replication component to recover journal data in the recovery journal volume.

Other embodiments of the disclosure include, without limitation, systems and articles of manufacture comprising processor-readable storage media, which are configured to manage replication journals in a distributed replication system.

DETAILED DESCRIPTION

Exemplary embodiments of the disclosure will now be discussed in further detail with regard to systems and methods for managing replication journals in a distributed replication system. More specifically, exemplary embodiments of the disclosure as discussed herein include systems and methods for managing journal capacity and recovery of journal data in response to failures of replication components in a distributed asynchronous replication system. For purposes of illustration, exemplary embodiments will be described herein with reference to exemplary network computing environments, such as distributed storage environments, which implement data processing systems and associated computers, servers, storage devices and other processing devices. It is to be appreciated, however, that these and other embodiments are not restricted to the particular illustrative system and device configurations shown.

Accordingly, the term "network computing environment" as used herein is intended to be broadly construed, so as to encompass, for example, processing systems comprising cloud computing and storage systems, as well as other types of processing systems comprising various combinations of physical and virtual processing resources. A network computing environment may therefore comprise, for example, at least one data center or other cloud-based systems that include one or more cloud systems that host multiple tenants which share cloud resources. Numerous different types of enterprise computing and storage systems are also encompassed by the term "network computing environment" as that term is broadly used herein.

Figure 1A:
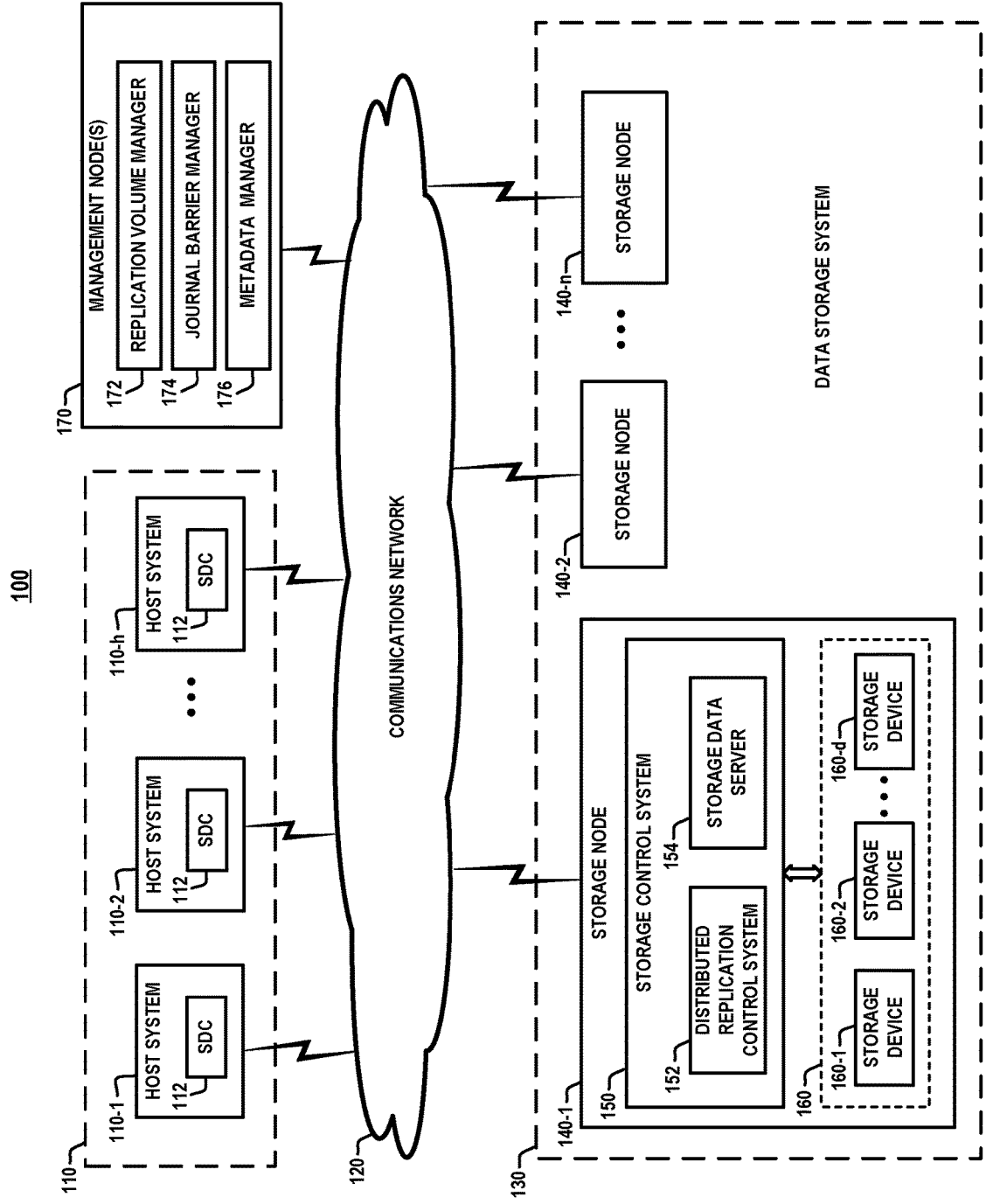
FIGS. 1A and 1B schematically illustrate a network computing system comprising a data storage system which implements a distributed replication system, according to an exemplary embodiment of the disclosure.
Figure 1B:
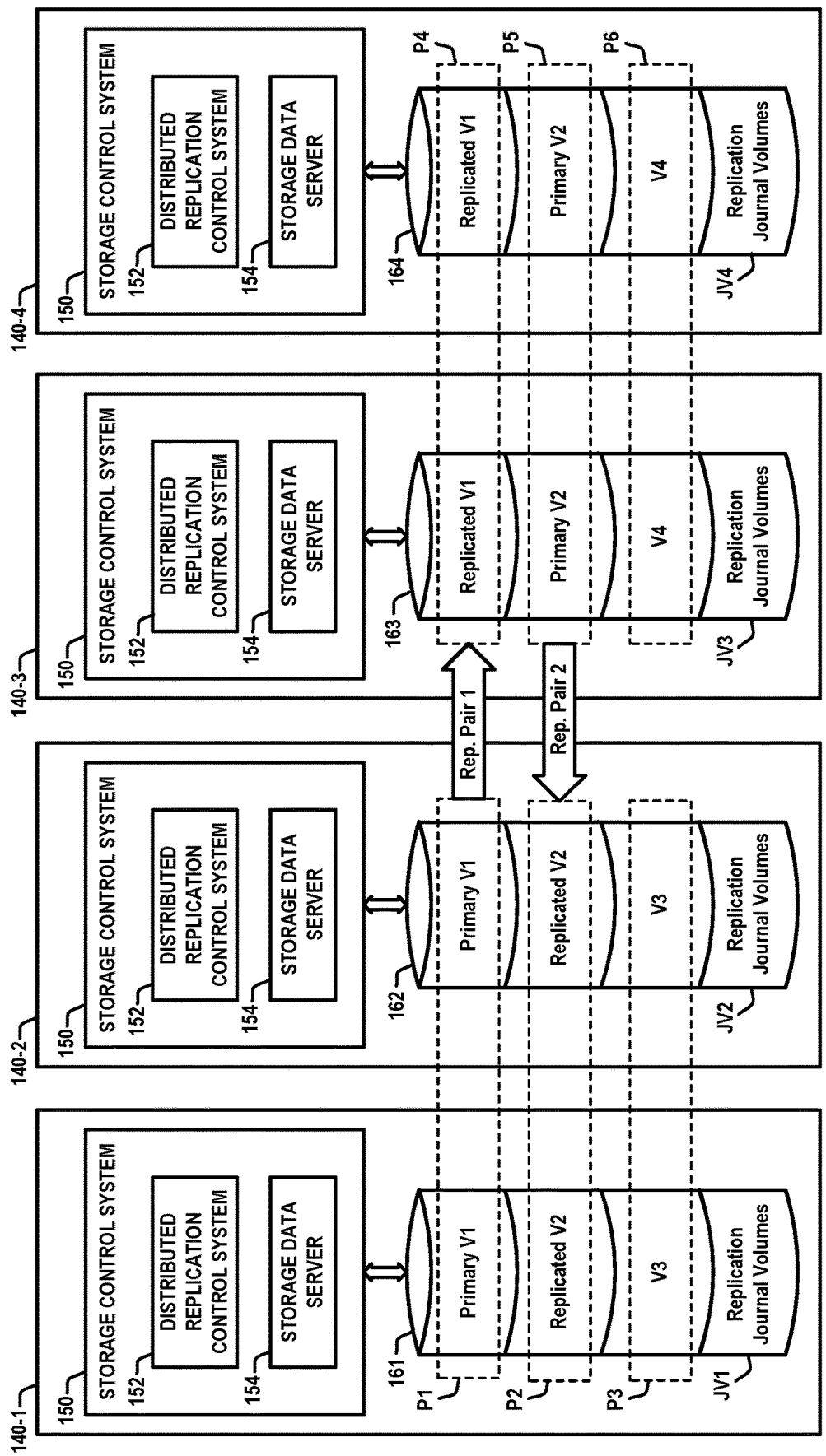

FIGS. 1A and 1B schematically illustrate a network computing system comprising a data storage system which implements a distributed replication system, according to an exemplary embodiment of the disclosure. In particular, FIG. 1A schematically illustrates a network computing system 100 which comprises one or more host systems 110-1, 110-2, . . . 110-$h$ (collectively, host systems 110), a communications network 120, and a data storage system 130. In some embodiments, each host system 110-1, 110-2, . . . 110-$h$ comprises a storage data client (SDC) 112, the function of which will be explained in further detail below. The data storage system 130 comprises one or more storage nodes 140-1, 140-2, . . . , 140-$n$ (collectively, storage nodes 140). As shown in FIG. 1, the storage node 140-1 comprises a storage control system 150, and an array of storage devices 160-1, 160-2, . . . , 160-$d$ (collectively, storage devices 160). In some embodiments, the other storage nodes 140-2 . . . 140-$n$ have the same or similar configuration as the storage node 140-1 shown in FIG. 1.

The storage control system 150 comprises a distributed replication control system 152 and a storage data server 154, the functions of which will be described in further detail below. In an exemplary embodiment, the distributed replication control system 152 implements a journal-based asynchronous replication system in which a replication workload is distributed among a plurality of replication components that are configured to process replication I/O operations for assigned portions of storage volumes. The network computing system 100 further comprises one or more management nodes 170. In general, the management nodes 170 implement application programming interfaces (APIs) to enable manual, automated, and/or semi-automated configuration, management, provisioning, and monitoring of the data storage system 130 and associated storage nodes 140. In some embodiments, the management nodes 170 comprise standalone dedicated management server nodes, which may comprise physical and/or virtual server nodes.

In the context of the exemplary embodiments disclosed herein, the management nodes 170 perform operations such as configuring asynchronous replication topologies in the data storage system 130, and controlling and managing asynchronous replication operations that are performed by the distributed replication control system 152. More specifically, the management nodes 170 implement a replication volume manager (RVM) module 172, a journal barrier manager module 174, and a metadata manager (MDM) module 176. The RVM module 172 implement various functions including, but not limited to, (i) tracking a total capacity that is allocated to replication journal volumes assigned to replication components (e.g., how much of the total capacity is free and how much is allocated to replication journal volumes), (ii) allocating, expanding, and deleting replication journal volumes assigned to replication components, (iii) declaring a replication journal volume of a crashed/failed replication component as a "recovery journal volume" and assigning the recovery journal volume to another replication component to perform a journal recovery process to recover journal data of the recovery journal volume, (iv) tracking the allocated and used capacity in each replication journal volume, and (v) reclaiming capacity of deleted replication journals, etc.

The journal barrier manager module 174 implements functions to generate barriers to close and open barrier journals. As explained in further detail below, barrier journals (or barrier intervals) are utilized as atomic replication units to support asynchronous replication. The replication I/O requests/operations that are handled by replication components on a source node are recorded in barrier journals, wherein a given barrier journal saves information regarding I/O write operations that were received between two points in time—a barrier opening and barrier closing. The opening and closing of barrier journals is controlled by the journal barrier manager module 174.

The MDM module 176 is configured to generate and manage metadata associated with replication topologies (e.g., distributed replication topology) in the data storage system 130 and to manage the metadata associated with the configured replication topologies, wherein the metadata is utilized to control replication operations that are performed by the distributed replication control systems 152 of the storage nodes 130. It is to be understood that the term "data replication system" as used herein collectively refers to all system components and modules that implement functions to configure, control, and manage a distributed replication system, as well as execute replication operations in the distributed replication system. For example, in the exemplary embodiment of FIG. 1A, the distributed replication control systems 152 (which execute on the storage nodes 130) and the RVM module 172, the journal barrier manager module 174, and the MDM module 176 (which execute on the management nodes 170) collectively constitute a data replication system, as that term is used herein.

The host systems 110 comprise physical server nodes and/or virtual server nodes which host and execute applications that are configured to process data and execute tasks/workloads and perform computational work, either individually, or in a distributed manner, to thereby provide compute services to one or more users (the term "user" herein is intended to be broadly construed so as to encompass numerous arrangements of human, hardware, software or firmware entities, as well as combinations of such entities). In some embodiments, the host systems 110 comprise application servers, database servers, etc. The host systems 110 can include virtual nodes such as virtual machines and container systems. In some embodiments, the host systems 110 comprise a cluster of computing nodes of an enterprise computing system, a cloud-based computing system, or other types of computing systems or information processing systems comprising multiple computing nodes associated with respective users. The host systems 110 issue data access requests to the data storage system 130, wherein the data access requests include (i) write requests to store data in one or more of the storage nodes 140 and (ii) read requests to access data that is stored in one or more of the storage nodes 140.

The communications network 120 is configured to enable communication between the host systems 110 and the storage nodes 140, and between the management nodes 170, the host systems 110, and the storage nodes 140, as well as to enable peer-to-peer communication between the storage nodes 140 of the data storage system 130. In this regard, while the communications network 120 is generically depicted in FIG. 1A, it is to be understood that the communications network 120 may comprise any known communication network such as, a global computer network (e.g., the Internet), a wide area network (WAN), a local area network (LAN), an intranet, a satellite network, a telephone or cable network, a cellular network, a wireless network such as Wi-Fi or WiMAX, a storage fabric (e.g., IP-based or Fiber Channel storage fabric), or various portions or combinations of these and other types of networks. In this regard, the term "network" as used herein is therefore intended to be broadly construed so as to encompass a wide variety of different network arrangements, including combinations of multiple networks possibly of different types, which enable communication using, e.g., Transfer Control Protocol/Internet Protocol (TCP/IP) or other communication protocols such as Fibre Channel (FC), FC over Ethernet (FCoE), Internet Small Computer System Interface (iSCSI), Peripheral Component Interconnect express (PCIe), InfiniBand, Gigabit Ethernet, etc., to implement I/O channels and support storage network connectivity. Numerous alternative networking arrangements are possible in a given embodiment, as will be appreciated by those skilled in the art.

The data storage system 130 may comprise any type of data storage system, or a combination of data storage systems, including, but not limited to, a storage area network (SAN) system, a network attached storage (NAS) system, dynamic scale-out data storage systems, or other types of distributed data storage systems comprising software-defined storage, clustered or distributed virtual and/or physical infrastructure. The term "data storage system" as used herein should be broadly construed and not viewed as being limited to storage systems of any particular type or types. In some embodiments, the data storage system 130 comprises a dynamic scale-out data storage system which allows additional storage nodes to be added to the cluster to scale the performance and storage capacity of the data storage system 130. It is to be noted that each storage node 140 and its associated array of storage devices 160 is an example of what is more generally referred to herein as a "storage system" or a "storage array."

In some embodiments, each storage node 140 comprises a server node that is implemented on, e.g., a physical server machine or storage appliance comprising hardware processors, system memory, and other hardware resources that execute software and firmware to implement the functionality of the storage node 140 and storage control system 150. In some embodiments, each storage node 140 comprises a plurality of storage control processors which execute a lightweight operating system (e.g., a customized lightweight Linux kernel) and functional software (e.g., software-defined storage software) to implement various functions of the storage node 140 and storage control system 150, wherein such functions include, but are not limited to, (i) managing and executing data access requests issued by the host systems 110, (ii) performing various data management and storage services, and (iii) controlling network communication and connectivity with the host systems 110 and between the storage nodes 140 within the cluster, etc.

In a distributed storage environment where the data storage system 130 comprises a cluster of storage nodes 140, the storage control systems 150 of the storage node cluster will communicate in a cooperative manner to process data access requests received from the host systems 110. The data management and storage functions and services implemented by the storage control systems 150 include, but are not limited to, aggregating/pooling the storage capacity of the storage nodes 140, performing functions such as inline data compression/decompression, deduplication, thin provisioning, and data protection functions such as data replication, snapshot, and data protection schemes based on data striping and parity (e.g., RAID), and other types of data management functions, depending on the system configuration.

The storage devices 160 of a given storage node 140 comprise one or more of various types of storage devices such as hard-disk drives (HDDs), solid-state drives (SSDs), Flash memory cards, or other types of non-volatile memory (NVM) devices including, but not limited to, non-volatile random-access memory (NVRAM), phase-change RAM (PC-RAM), magnetic RAM (MRAM), etc. In some embodiments, the storage devices 160 comprise flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices 160 may be implemented in each storage node 140. In this regard, the term "storage device" as used herein should be broadly construed to encompass all types of persistent storage media including hybrid drives. On a given storage node 140, the storage control system 150 communicates with the data storage devices 160 through any suitable host interface, e.g., a host bus adapter, using suitable protocols such as Advanced Technology Attachment (ATA), serial ATA (SATA), external SATA (eSATA), parallel ATA (PATA), non-volatile memory express (NVMe), small computer system interface (SCSI), serial attached SCSI (SAS), peripheral component interconnect express (PCIe), etc.

As noted above, the data storage system 130 can implement any type of dynamic scale-out storage system in which the number of storage nodes within the storage cluster can change over time. In an exemplary embodiment, the data storage system 130 comprises a dynamic scale-out SAN storage system that is configured to implement a high-capacity block-level storage system architecture which consolidates the capacity of the storage devices 160 (e.g., HDDs, SSDs, PCIe or NVMe flash cards, etc.) of the storage nodes 140 into logical storage volumes (e.g., a block unit of storage management) which are identified by, e.g., logical unit numbers (LUNs). In addition, a logical storage volume can be further divided or partitioned into block units that are identified by LUNs. In the SAN storage system, each storage node 140 within the data storage system 130 executes a lightweight operating system and associated software-defined storage software to implement a software-defined storage environment in which the storage nodes 140 form a loosely coupled storage server cluster in which the storage nodes 140 collectively communicate and operate to create a server-based SAN system (e.g., virtual SAN) to provide host access to a virtual pool of block storage using the combined storage capacity (e.g., local or network storage devices) of the storage nodes 140.

More specifically, in the scale-out SDS environment, the storage data servers 154 of the storage control systems 150 are configured to create and manage storage pools (e.g., virtual pools of block storage) by aggregating storage capacity from their respective storage devices 160 and dividing a given storage pool into one or more volumes, wherein the volumes are exposed to the SDCs 112 of the host systems 110 as block devices. The storage data servers 154 expose abstractions of block devices (e.g., virtual block devices). For example, a virtual block device can correspond to a volume of a storage pool. Each virtual block device comprises any number of actual physical storage devices, wherein each block device is preferably homogenous in terms of the type of storage devices that make up the block device (e.g., a block device can include only HDD devices or SSD devices, etc.). In this regard, each instance of the storage data server 154 that runs on a respective one of the storage nodes 140 contributes its local storage space to an aggregated virtual pool of block storage with varying performance tiers (e.g., HDD, SSD, etc.) within a virtual SAN.

While the host systems 110 can communicate over a front-end network (e.g., LAN/WAN), a SAN utilizes a dedicated storage network (e.g., a Fibre Channel fabric, an iSCSI fabric, etc.) to provide an any-to-any connection between the host systems 110 and the storage nodes 140. In this regard, the communications network 120 generically represents such a front-end network and dedicated storage network, although such networks can be integrated into a converged Ethernet network. In particular, in some embodiments, the storage nodes 140 of the data storage system 130 are interconnected in a full-mesh network, wherein back-end interconnectivity between the storage control systems 150 of the storage nodes 140 is achieved using, e.g., a redundant high-speed storage fabric (e.g., 40 Gbps InfiniBand). In some embodiments, the storage nodes 140 utilize remote procedure calls (RPC) for control messages and remote direct memory access (RDMA) for moving data blocks. In some embodiments, the host systems 110 communicate with the storage nodes 140 in a SAN configuration using Ethernet iSCSI and/or Fibre Channel connectivity protocols over the SAN fabric. The SAN fabric comprises SAN networking devices such as SAN switches, routers, protocol bridges, gateway devices, and cables, etc. The SAN network devices move data within the SAN, or between an "initiator" (e.g., an HBA port of, e.g., an application server of a host system 110) and a "target" (e.g., a port of a storage node 140).

In some embodiments, the storage data servers 154, the SDCs 112, and the MDM module 176 are components which provide a software-defined storage environment. Each SDC 112 that executes on a given host system 110 comprises a lightweight block device driver that is deployed to expose shared block volumes to the host systems 110 (e.g., each SDC 112 exposes the storage volumes as block devices to each application residing on the same server (e.g., host system 110) on which the SDC 112 is installed. In some embodiments, as shown in FIG. 1A, the SDCs 112 run on the same server machines as the host systems 110 which require access to the block devices exposed and managed by the storage data servers 154 of the storage nodes 140. The SDC 112 of a given host system 110 exposes block devices representing the virtual storage volumes that are currently mapped to the given host system 110. In particular, the SDC 112 for a given host system 110 serves as a block driver for the host system 110, wherein the SDC 112 intercepts I/O requests, and utilizes the intercepted I/O request to access the block storage that is managed by the storage data servers 154. The SDC 112 provides the operating system or hypervisor (which runs the SDC) access to the logical block devices (e.g., volumes). The SDCs 112 have knowledge of which storage data servers 154 hold its block data, so multipathing can be accomplished natively through the SDCs 112.

As noted above, the management nodes 170 in FIG. 1A implement a management layer which manages and configures the network computing environment 100. In some embodiments, the management nodes 170 comprise a tightly-coupled cluster of manager nodes that are configured to supervise the operations of the storage cluster and manage storage cluster configurations. For example, the MDM modules 176 of the manager nodes 170 operate outside of the data path and provide the relevant information to the SDCs 112 and the storage nodes 140 to allow such components to control data path operations. The MDM modules 176 are configured to manage the mapping of SDCs 112 to the storage data servers 154 of the storage nodes 140. The MDM modules 176 manage various types of metadata that are required to perform various management operations in the storage environment such as, e.g., managing configuration changes, managing the SDCs 112 and storage data servers 154, maintaining and updating device mappings, maintaining management metadata for controlling data protection operations such as snapshots, replication, RAID configurations, etc., managing system capacity including device allocations and/or release of capacity, performing operation for recovery from errors and failures, and system rebuild tasks including rebalancing, etc.

While FIG. 1A shows an exemplary embodiment of a two-layer deployment in which the host systems 110 are separate from the storage nodes 140 and connected by the communications network 120, in other embodiments, a converged infrastructure (e.g., hyperconverged infrastructure) can be implemented to consolidate the host systems 110, the storage nodes 140, and communications network 120 together in an engineered system. For example, in a hyperconverged deployment, a single-layer deployment is implemented in which the SDCs 112 and storage data servers 154 run on the same nodes (e.g., each node deploys a storage data client and a storage data server) such that each node is a data storage consumer and a data storage supplier. In other embodiments, the system of FIG. 1A can be implemented with a combination of a single-layer and two-layer deployment.

FIG. 1B schematically illustrates an exemplary configuration of a distributed replication topology which can be implemented in the system 100 of FIG. 1A. In particular, FIG. 1B illustrates four storage nodes 140-1, 140-2, 140-3, and 140-4 which are configured to implement an asynchronous replication topology comprising two primary volumes (e.g., Primary V1 and Primary V2) and associated replicated volumes (Replicated V1 and Replicated V2). As shown in FIG. 1B, each storage node 140-1, 140-2, 140-3, and 140-4 comprises an instance of the storage control system 150, wherein each storage control system 150, in turn, comprises an instance of the distributed replication control system 152 and the storage data server 154. The storage nodes 140-1, 140-2, 140-3, and 140-4 comprise respective storage capacity 161, 162, 163, and 164, which is pooled to form storage pools P1, P2, P3, P4, P5, and P6. It is to be noted that the storage capacities 161, 162, 163, and 164 as shown in FIG. 1B represents the storage capacity provided by the respective array of storage devices 160 on each storage nodes as shown in FIG. 1A.

In particular, in the exemplary embodiment of FIG. 1B, the storage pools P1, P2, and P3 are each implemented using a portion of the storage capacity 161 and 162 of the respective storage nodes 140-1 and 140-2, and the storage pools P4, P5, and P6 are each implemented using a portion of the storage capacity 163 and 164 of the respective storage nodes 140-3 and 140-4. The capacity of the storage pool P1 is allocated for the primary volume V1, and the capacity of the storage pool P4 is allocated for the corresponding replicated volume V1. The capacity of the storage pool P5 is allocated for the primary volume V2, and the capacity of the storage pool P2 is allocated for the corresponding replicated volume V2. Furthermore, in the exemplary embodiment of FIG. 1B, the capacity of the storage pool P3 is allocated for a non-replicated volume V3, and the capacity of the storage pool P6 is allocated for a non-replicated volume V4.

Furthermore, a portion of the storage capacity 161 of the storage node 140-1 is allocated to replication journal volumes JV1 that are generated and assigned to corresponding replication components of the distributed control system 152 which executes on the storage node 140-1. In addition, a portion of the storage capacity 162 of the storage node 140-2 is allocated to replication journal volumes JV2 that are generated and assigned to corresponding replication components of the distributed control system 152 which executes on the storage node 140-2. Similarly, a portion of the storage capacity 163 of the storage node 140-3 is allocated to replication journal volumes JV3 that are generated and assigned to corresponding replication components of the distributed control system 152 which executes on the storage node 140-3. Moreover, a portion of the storage capacity 164 of the storage node 140-4 is allocated to replication journal volumes JV4 that are generated and assigned to corresponding replication components of the distributed control system 152 which executes on the storage node 140-4.

In the exemplary replication topology shown in FIG. 1B, the volumes V1 and V2 on the storage nodes 140-1, 140-2, 140-3, and 140-4 are part of a "replication consistency group", which refers to a logical container for volumes whose application data need to be replicated with consistency. A replication consistency group contains one or more replication pairs, wherein each replication pair comprise a pair of volumes with a primary volume residing in at least one source node and a replica volume residing in at least one destination (replica) node, wherein data of the primary volume is copied to the replicated volume. A replication consistency group is defined, e.g., by (i) a replication pair, (ii) a replication direction (source domain to target domain), and (iii) replication polices such as RPO. In the exemplary embodiment of FIG. 1B, the primary volume V1 and the replicated volume V1 comprise a first replication pair for the volume V1, wherein the storage nodes 140-1 and 140-2 are deemed source nodes the storage nodes 140-3 and 140-4 are deemed replica nodes with regard to the first replication pair for volume V1. Similarly, the primary volume V2 and the replicated volume V2 comprise a second replication pair for the volume V2, wherein the storage nodes 140-3 and 140-4 are deemed source nodes and the storage nodes 140-1 and 140-2 are deemed replica nodes with regard to the second replication pair for volume V2.

The volumes V3 and V4 are allocated to store non-replicated data. In this instance, the storage data servers 154 directly receive and handle I/O requests that are directed to the non-replicated volumes V3 and V4. On the other hand, the distributed replication control systems 152 initially receive and handle I/O requests directed to replicated volumes, and utilize the replication journal volumes JV1, JV2, JV3, and JV4 to write journal data in the journal volumes to thereby record information regarding I/O write operations that are performed for replicated volumes. In some embodiments, the distributed replication control system 152 comprises a write splitter function which is configured to split (e.g., duplicate) replication write operations. For example, to execute a replication I/O write operation, the distributed replication control system 152 will initially receive the replication I/O request, write the required journal data to a replication journal volume, and then send a duplicate of the replication I/O write request and associated user data to the storage data server 154, wherein the storage data server 154 performs write operations to write the received I/O user data in a primary volume.

Figure 2:
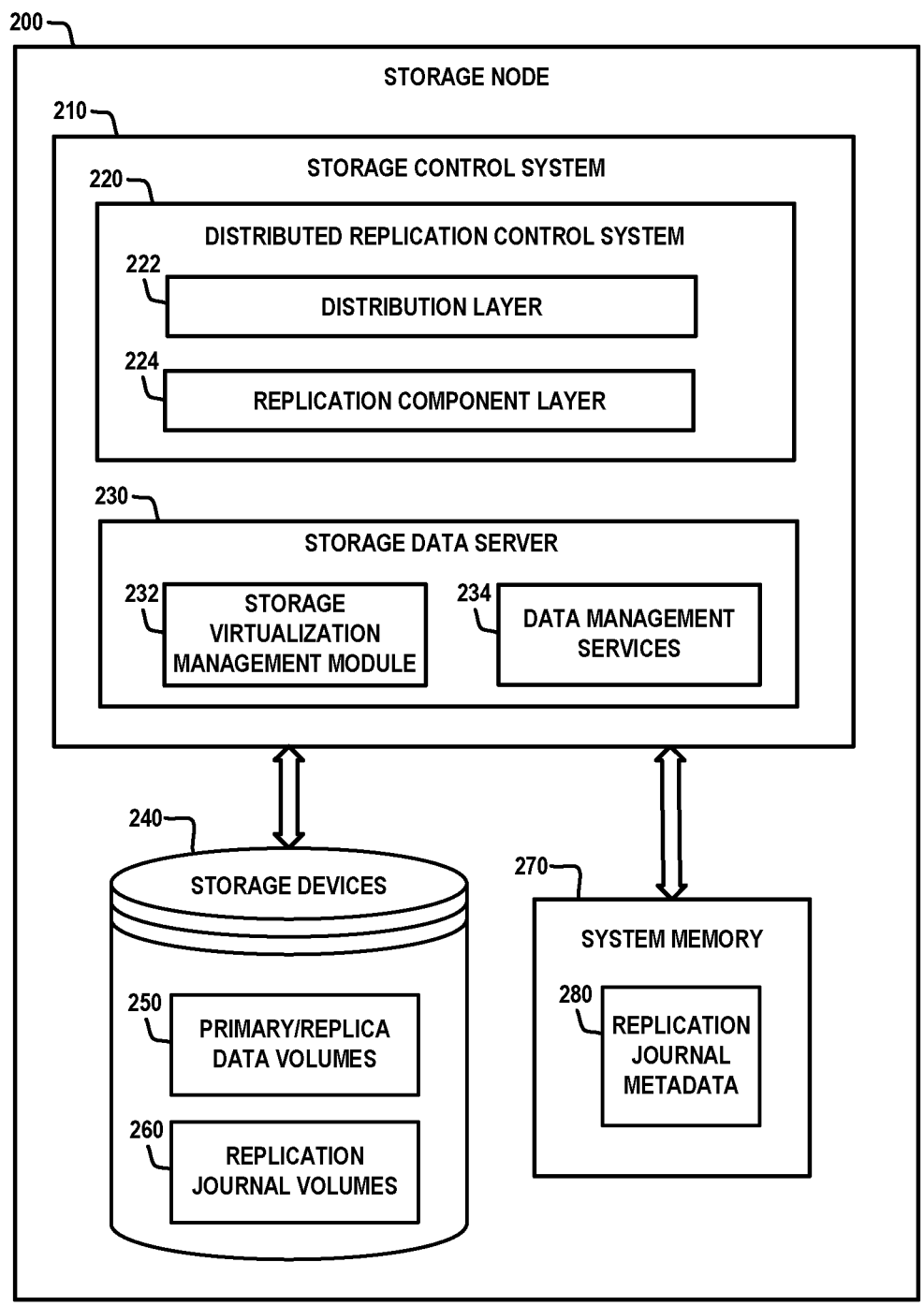
FIG. 2 schematically illustrates a storage node which comprises a distributed replication control system that is configured to implement journal-based asynchronous data replication, according to an exemplary embodiment of the disclosure.

FIG. 2 schematically illustrates a storage node which comprises a distributed replication control system that is configured to implement journal-based asynchronous data replication, according to an exemplary embodiment of the disclosure. In some embodiments, FIG. 2 schematically illustrate an exemplary architecture of the storage nodes 140 of the data storage system 130 of FIGS. 1A and 1B. As shown in FIG. 2, the storage node 200 comprises a storage control system 210 which comprises a distributed replication control system 220, and a storage data server 230. The distributed replication control system 220 comprises a distribution layer 222 and a replication component layer 224 (alternatively, replication layer 224). The storage data server 230 comprises a storage virtualization management module 232, and a data management services module 234. The storage node 200 comprises a plurality of storage devices 240 in which the storage capacity of the storage devices 240 is logically portioned into volumes which include primary and replica data volumes 250, and replication journal volumes 260. In some embodiments, the volumes 250 and 260 are generated by operation of the storage virtualization management module 232. In addition, the storage node 200 comprises system memory 270 which, in some embodiments, is utilized by the replication layer 224 to store replication journal metadata 280.

In some embodiments, the replication component layer 224 comprises a plurality of replication components that are configured to handle replication workload associated with asynchronous replication operations. The distributed replication control system 220 enables scale-out replication by distributing the replication workload over many replication components in the replication layer 224, and allowing the replication components to process their respective replication workloads independently with minimal coordination between the replication components. In a journal-based asynchronous replication system, scale-out is achieved by distributing the replication workload across the replication components, wherein a significant portion of the replication workload involves (i) a source node writing journal data to a journal volume, and transmitting the journal data to a replica node, and (ii) a replica node storing received journal data in a journal volume and utilizing the journal data to generate a replicated image of the source data on the replica node. To achieve scalability, each replication component must be able to read and write to the journal without requiring coordination with the other replication components. In this regard, each replication component is assigned to an associated replication journal volume to which the replication component writes journaled data.

The distribution layer 222 is configured to distribute I/O workload among the replication components in the replication layer 224 according to a current distribution instance provided to the distribution layer 222 from the MDM module 176 (FIG. 1A). Occasionally, the MDM module 176 modifies the distribution of the replication workload by sending a new distribution instance to the distribution layer 222. In some embodiments, each distribution instance comprises (i) a distribution function $f$: offset→replication component, and (ii) a unique distribution ID. The distribution function provides information which specifies the portions (e.g., address block) of the primary/replicated users volumes that are assigned to the replication components to perform replication I/O operations. For example, on a source node, the distribution layer 222 is configured to (i) receive a replication I/O request corresponding to a given address, (ii) identify a given replication component in the replication component layer 224 which is currently assigned to handle replication workload associated with the given address, (iii) assign a distribution identifier (ID) corresponding to the current distribution instance to the replication I/O request, and (iv) send the replication I/O request and associated distribution ID to the proper replication component in the replication layer 224.

As shown in FIG. 2, the replication layer 224 sits above storage data server 230, wherein each I/O for a replicated volume is processed by a replication component of the replication layer 224 before being sent to the storage data server 230 to store the I/O data in a target user volume. When a replication I/O write request is sent to a given replication component in the replication layer 224 from the distribution layer 222, the replication component will record information regarding the replication I/O write operation into a currently open barrier journal which is stored in an associated replication journal volume of the replication component. The manner in which I/O write data is stored in a replication journal will vary depending on the implementation.

For example, in some embodiments, a copy of the I/O write data is stored in a replication journal volume 260 in storage (e.g., HDD, or SSD storage) while replication journal metadata 280 is stored in the system memory 270. In this instance, a given replication journal volume 260 will comprises an actual copy of the data that was written to the primary data volume 250, while the replication journal metadata 280 comprises information regarding the I/O write transaction, including, but not limited to, one or more identifiers, a time stamp (denoting date and time at which the I/O write transaction was received by source), a write size of the data block, a location (pointer) in the replication journal volume 260 where the actual I/O write data is stored, a location in the replica volume where the data is to be written, etc. In some embodiments, the metadata of the replication I/O write operation is stored along with a copy of the replication I/O write data in a current barrier journal that is stored in one of the replication journal volumes 260.

Figure 3:
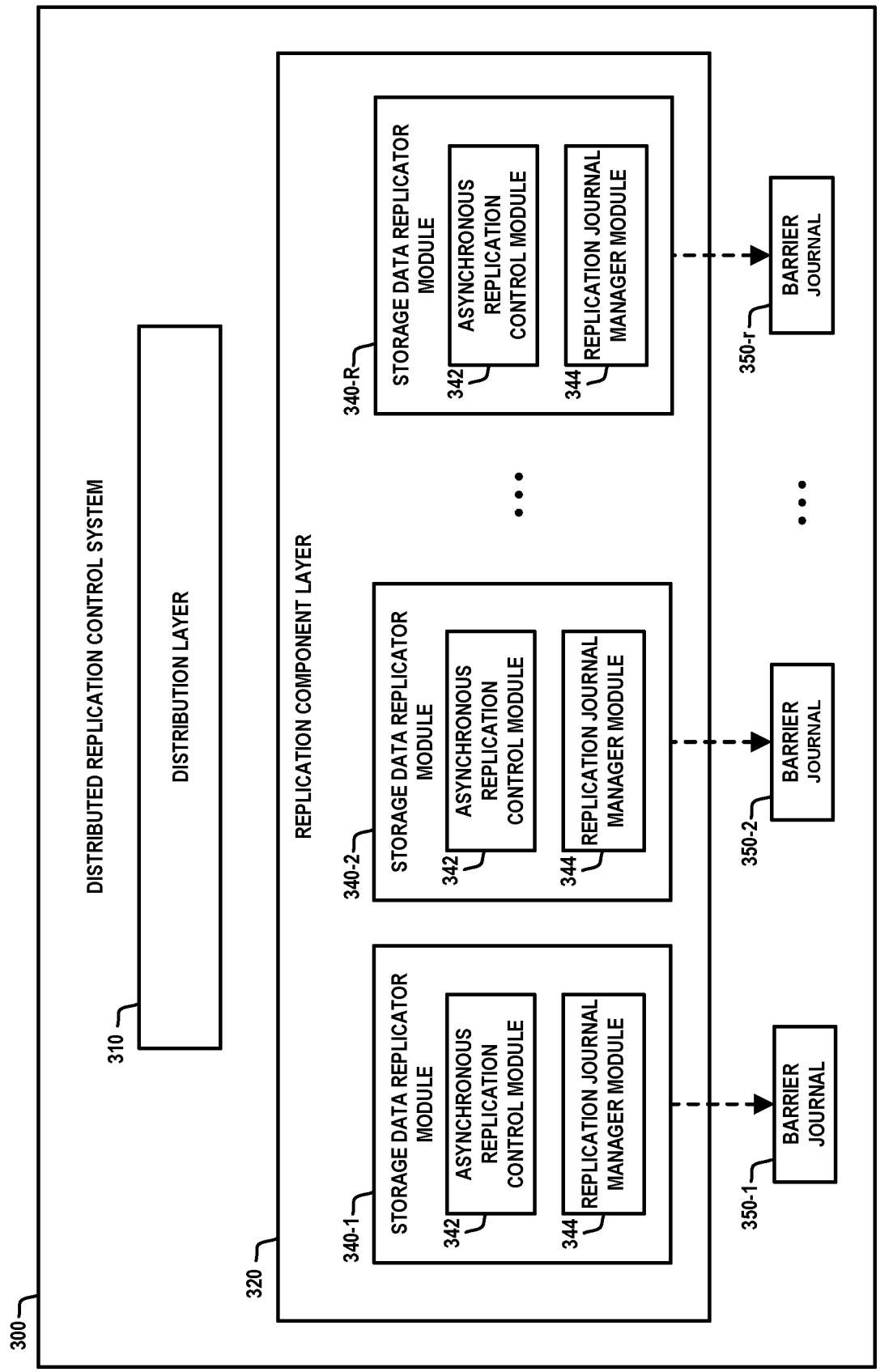
FIG. 3 schematically illustrates a distributed replication control system that is configured to implement journal-based asynchronous data replication, according to an exemplary embodiment of the disclosure.

FIG. 3 schematically illustrates a distributed replication control system 300 that is configured to implement journal-based asynchronous data replication, according to an exemplary embodiment of the disclosure. In some embodiments, FIG. 3 schematically illustrates an exemplary embodiment of the distributed replication control systems shown in FIGS. 1A, 1B, and 2. The distributed replication control system 300 comprises a distribution layer 310, and a replication component layer 320. The replication component layer 320 comprises a plurality of storage data replicator (SDR) modules 340-1, 340-2, ..., 340-R (alternatively, replication components 340-1, 340-2, ..., 340-R). The SDR modules 340-1, 340-2, ..., 340-R each implement an instance of an asynchronous replication control module 342, and an instance of a replication journal manager module 344.

The distribution layer 310 implements the same functions as the distribution layer 222 (FIG. 2) as discussed above. The distribution layer 310 distributes received replication workload (e.g., replication I/O requests received from an application/user to store data, journal data transmitted from a source node, etc.) to the SDR modules 340-1, 340-2, ..., 340-R based on a current distribution instance of the distribution layer 310. It is to be understood each of the SDR modules 340-1, 340-2, ..., 340-R can be configured to operate as source replication components and/or destination replication components, depending on whether the storage node on which the replication layer 320 resides includes only primary volumes, only replication volumes, or both primary and replication volumes of different replication volume pairs.

The asynchronous replication control modules 342 implement methods that are configured to manage and control various asynchronous replication operations depending on whether the SDR modules 340-1, 340-2, ..., 340-R operate as source replication components and/or destination replication components. For example, for a source replication component, the asynchronous replication control module 342 performs methods including, but not limited to, (i) receiving incoming replication I/O requests from the distribution layer 310, and forwarding such replication I/O requests to the replication journal manager module 344 (to journal incoming write operations) and to the associated storage data server (to read/store data from/to a primary volume), and (ii) continuously transmitting blocks of journal data to destination nodes to generate consistent replica images in replicated volumes, etc. Furthermore, for a destination replication component, the asynchronous replication control module 342 performs operations including, but not limited to, (i) receiving (from the distribution layer 31) blocks of journal data transmitted from source nodes, and (ii) forwarding the received blocks of journal data to the replication journal manager 344 and to the associated storage data server to store consistent replicas of the source data in replicated volumes on the destination nodes, etc.

The replication journal management modules 344 implement various methods to generate and manage replication journals for asynchronous replication workloads that are processed by the distributed replication control system 300, depending on whether the SDR modules 340-1, 340-2, ..., 340-R operate as source replication components and/or destination replication components. For example, for a source replication component, the replication journal management module 344 performs methods including, but not limited to, (i) generating journal data to record incoming replication I/O write operations, (ii) closing and opening barrier journals when instructed, (iii) performing write-folding on journals, etc. For example, as shown in FIG. 3, the SDR modules 340-1, 340-2, ..., 340-R generate respective barrier journals 350-1, 350-2, ..., 350-r (during a current data collection interval), which are stored in associated replication journal volumes that are assigned to the SDR modules 340-1, 340-2, ..., 340-R, before asynchronously transmitting the barrier journals 350-1, 350-2, ..., 350-r to destination nodes. Furthermore, for a destination replication component, the replication journal management module 344 performs methods including, but not limited to, storing received blocks of journal data in associated replication journal volumes that are assigned to the SDR modules 340-1, 340-2, ..., 340-R, and applying the journal data to replicated volumes in a consistent manner to generate replica images of the source data in replicated volumes.

Figure 4A:
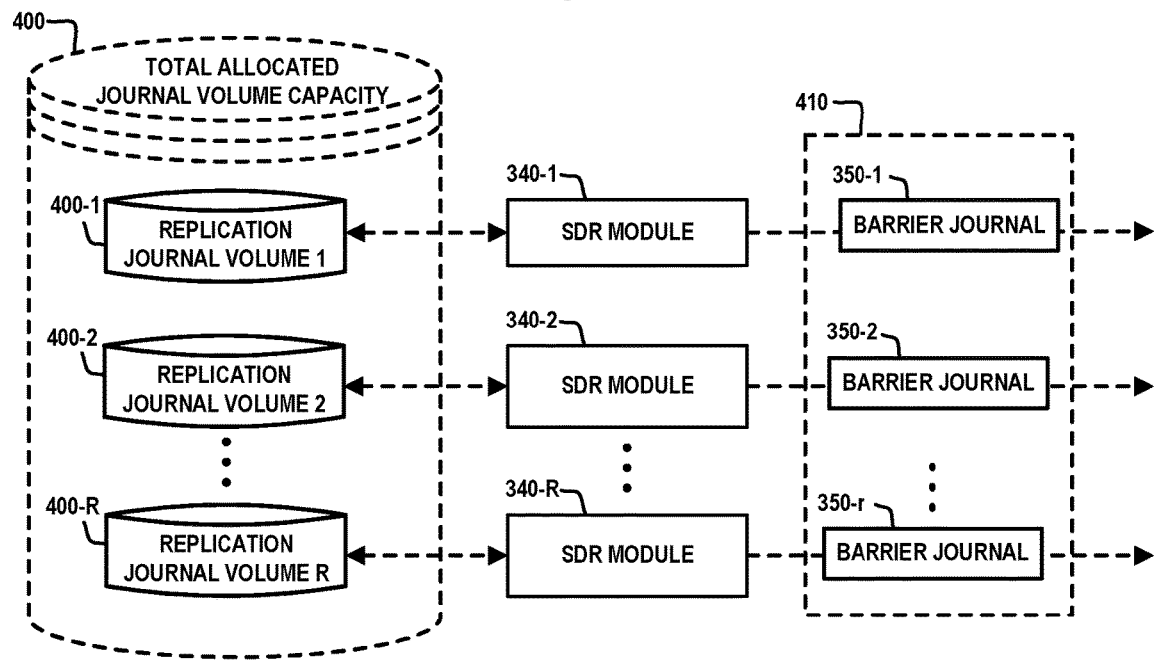
FIGS. 4A and 4B schematically illustrate operations of a journal-based distributed replication system, according to an exemplary embodiment of the disclosure.
Figure 4B:
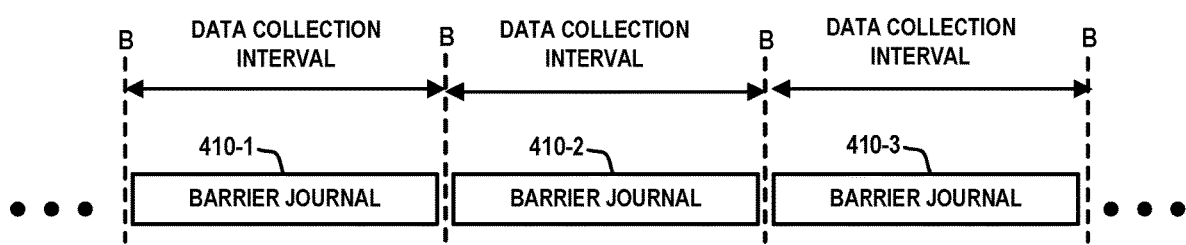
Figure 4B:
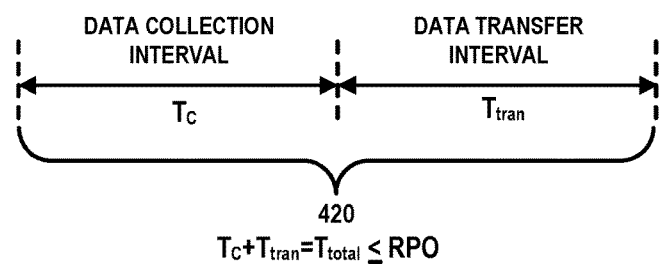

FIGS. 4A and 4B schematically illustrate operations of a journal-based distributed replication system, according to an exemplary embodiment of the disclosure. In some embodiments, FIG. 4A schematically illustrates a configuration of the distributed replication control system 300 of FIG. 3 with the SDR modules 340-1, 340-2, ..., 340-R operating as source replication components. FIG. 4A schematically illustrates a plurality of replication journal volumes 400-1, 400-2, ..., 400-R, which are assigned to the respective SDR modules 340-1, 340-2, ..., 340-R. The replication journal volumes 400-1, 400-2, ..., 400-R are created from a total allocated amount of storage capacity 400 of a given storage node, which allocated for creating replication journal volumes for the SDR modules that execute on the given storage node.

As further shown in FIG. 4A, the SDR modules 340-1, 340-2, ..., 340-R operating as source replication components generate respective barrier journals 350-1, 350-2, ..., 350-r (alternatively, barrier-intervals, or interval-journals), wherein the barrier journals 350-1, 350-2, ..., 350-r comprise portions of an overall barrier journal 410 for a given data collection interval. The barrier journal 410 represents a collection of all replication I/O write operation that were logged (by the SDR modules 340-1, 340-2, ..., 340-R) in the respective journal barriers of the SDR modules 340-1, 340-2, ..., 340-R of the replication layer during a given data collection interval. The data collection interval for the barrier journal 410 is defined by journal barriers that are generated (via the journal barrier manager module 174, FIG. 1A) to open and close the given barrier journal 410.

For example, FIG. 4B illustrates a sequence of barrier journals 410-1, 410-2, 410-3, etc., that are generated during different data collection intervals bounded by different barriers B (alternatively, journal barriers B). The barriers B are generated (via the journal barrier manager module 174, FIG. 1) at different points in time to open and close the respective barrier journals 410-1, 410-2, and 410-3. In FIG. 4B, each barrier journal 410-1, 410-2, and 410-3 represents a collection of all barrier journals 350-1, 350-2, ..., 350-r that are generated by the respective SDR modules 340-1, 340-2, ..., 340-R during each of the different data collection intervals. On a source node, the source replication components will log I/O write operations (metadata and actual data) for a given replication workload in sequence into an open journal barrier (which is created at a given point in time). At the end of the given data collection interval, the current journal barrier is closed, and a new barrier interval is opened. The journal barrier (which includes all I/O write data that is collected up to the time of the closing of the journal barrier) is transmitted to the destination node(s) for synchronizing the journal data to the replica volume. In this regard, journal-based asynchronous replication enables the application of write sequence metadata so that when the contents of the journal volume are copied to the destination node, writes are committed to the replica volume in the same order that they were committed to the source volume.

In some embodiments, the replication barrier journal for the replication workload performed by the replication layer 320 is divided into data collection intervals based at least in part on a recovery point objective (RPO) for the given replication workload. An RPO is a user-defined metric which is typically specified by, e.g., a service level agreement. The data collection interval is determined based at least in part on the RPO and internal system conditions in a manner which enables compliance with the recovery point objective. In general, RPO refers to an acceptable amount of data loss measured in time relative to when failure event or disaster occurs at the primary (source) site. More particularly, RPO denotes a maximum acceptable delay time between the time when data is committed at the primary site and the time when the data is committed to the replica (target) site. The RPO value is specified when configuring the replication system, and is utilized to manage replication scheduling. An RPO can be specified in hours, minutes, or seconds, etc., depending on the given criticality of the application data, customer needs, etc.

FIG. 4B schematically illustrates an asynchronous data replication scheduling process for transmitting barrier journals that are generated during data collection intervals in compliance with an RPO for a given replication workload. As shown in FIG. 4B, a scheduling process comprises a data collection interval, and a data transfer interval 320. The data collection interval represents a time interval (Tc) for collecting data that is associated with a plurality of replication I/O write operations for a given replication workload that is performed by all source replication components of a replication layer within a predefined barrier interval. The data transfer interval represents a time interval ($T_{tran}$) for transmitting a block of journal data (e.g., each barrier journal 410-1, 410-2, 410-2) to a replica site and committing the section of journal data to a replica journal.

As further shown in FIG. 4B, to comply with the specified RPO, a sum total time ($T_{total}$) of the data collection interval and the data transfer interval should be less or equal to the specified RPO for the given asynchronous replication process. In some embodiments, the time period of the data collection interval is set to be no longer than one-half RPO (i.e., RPO/2). This is based on an assumption that the time required to synchronize a barrier journal (transmit and commit) is less than or equal to the time needed to write the same data at the primary site. An implementation selects the interval length of the data collection interval according to the developer's considerations. Assume that the RPO is set to 5 minutes. In this example, an RPO of 5 minutes means that the latest available replica data volume should not reflect a state that is older than 5 minutes.

In accordance with exemplary embodiments of the disclosure, the journal barrier manager module 174, and the MDM module 176 (FIG. 1A) are configured to control the closing and opening of barrier journals and track the transmission and receipt of barrier journals from source replication components to destination replication components. For example, for a given barrier journal, barrier_i, each replication component (e.g., SDR module) will generate portion (denoted S_barrier_i) of the given barrier journal barrier_i. When the journal barrier manager module 174 decides to close the given barrier journal barrier_i and open a new barrier journal barrier j, the journal barrier manager module 174 will command each replication component to close its respective portion S_barrier_i of the given barrier journal barrier_i. Each replication component in the source node will transmit its respective portion S_barrier_i of the given (closed) barrier journal barrier_i independently of other replication components, and then notify the journal barrier manager module 174 and/or the MDM module 176 of the successful transmission of the respective portion S_barrier 1. The journal barrier manager module 174 and/or the MDM module 176 will deem that the closed barrier journal barrier_i has been successfully and fully transmitted if all portions S_barrier_i of the given barrier journal barrier_i have been successfully transmitted from the source replication components to the destination node(s). The journal barrier manager module 174 and/or the MDM module 176 will then command the destination replication components in the replication layer of the destination node (which received the transmitted portions S_barrier_i of the closed barrier journal barrier_i) to commit the respective portions S_barrier_i to the replicated volume, which they do independently from each other.

The exemplary distributed replication systems described herein are configured to distribute a replication workload to a plurality of replication components and allow the replication components to work independently with minimal coordination. This eliminates the need to implement a coordination mechanism in a scale-out replication system with potentially many replication components, wherein such coordination can be significantly complex, and add load to the network and to the resources needed for processing such coordination mechanism. The processing load generated by a coordination mechanism would grow with the number of scale-out components and therefore a solution requiring coordination cannot scale well. On the other hand, a scale-out replication system should be able to continue with a replication process even in the event of a failure of one or more replication components.

In accordance with exemplary embodiments of the disclosure, when a given replication component fails, other replication components will be configured to process the replication I/O workload assigned to the failed replication component and to recover the journal data previously generated by the failed replication component prior to the failure event. This allows asynchronous replication operations to continue, notwithstanding failed replication components, to thereby create a consistent replica image on the destination through the operation of other active replication components. As will be explained in further detail below, each replication component is assigned its own replication journal volume. While a given replication component is active and operating, the given replication component will have exclusive access to its assigned replication journal volume. When the given replication component fails, the associated replication journal volume of the failed replication component is assigned to a recovery replication component. The recovery replication component reads and transmits the data from the replication journal volume of the failed replication component, but does not write any new data to the replication journal volume. Once all the journal data has been transmitted and trimmed, the replication journal volume of the failed replication component can be deleted. If the failed replication component is restored, the restored replication component is assigned a new replication journal volume to store barrier journals generated by the replication component, and the restored replication component starts participating in the replication process from that point with no need to merge the history from the previously replication journal volume. In other embodiments, a restored replication component can be reassigned its previous replication journal volume. The reassigned replication journal volume may either remain a recovery journal volume that is accessed only for reading and recovering journal data, or the recovery journal volume can be transformed to a regular replication journal volume to store logs of new replication I/O write operations.

Figure 5:
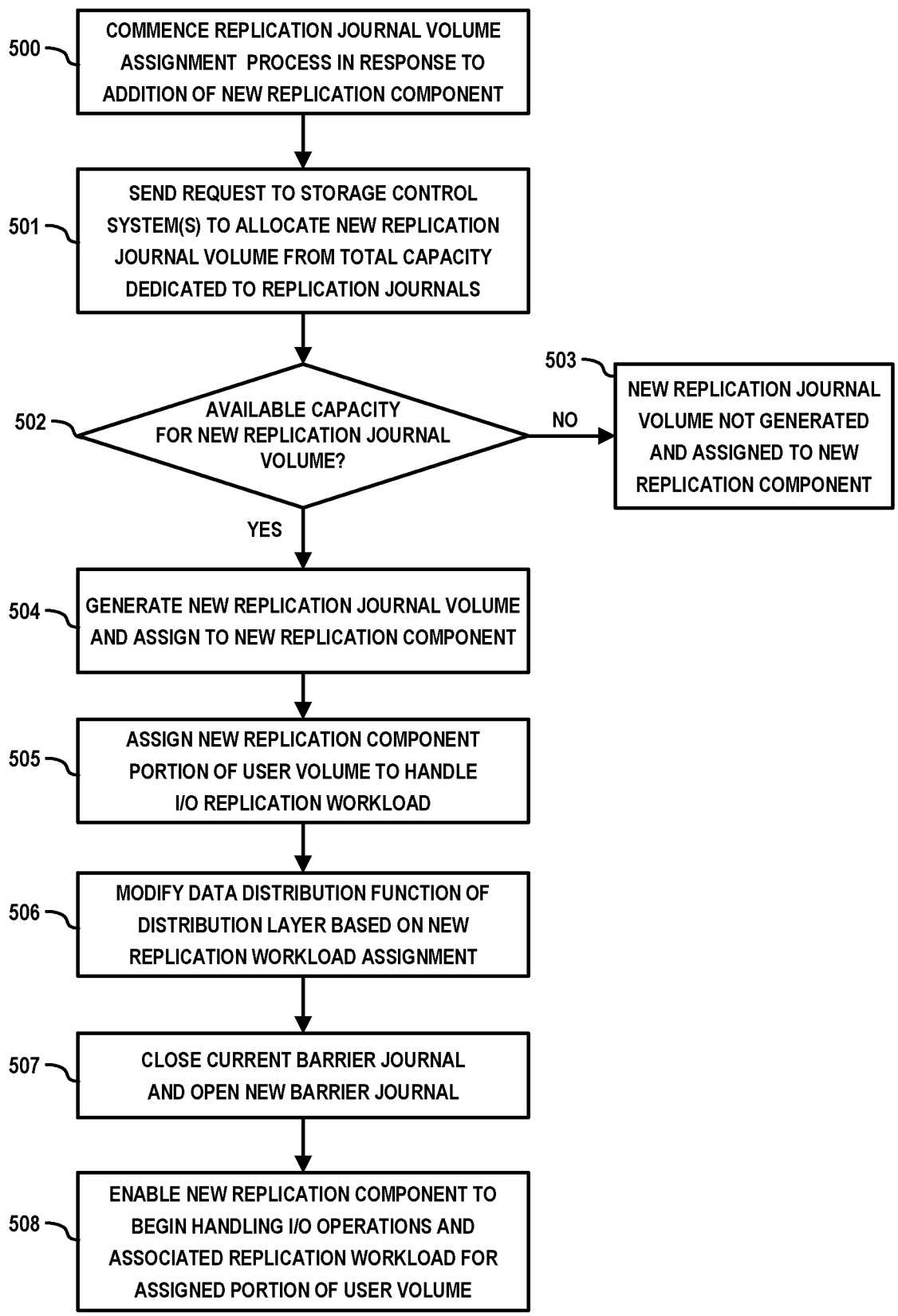
FIG. 5 illustrates a flow diagram of a method for assigning a replication journal volume to a replication component in a distributed replication system, according to an exemplary embodiment of the disclosure.

FIG. 5 illustrates a flow diagram of a method for assigning a replication journal volume to a replication component in a distributed replication system, according to an exemplary embodiment of the disclosure. As noted above, in some embodiments, the replication volume manager module 172 (FIG. 1) is configured to manage the assignment of replication journal volumes to replication components (e.g., SDR modules 340, FIG. 3). In this regard, in some embodiments, FIG. 5 illustrates an exemplary process which is performed by the management nodes 170 (FIG. 1) when a replication component is newly added to a replication component layer. More specifically, in the context of the exemplary embodiment of FIG. 3, a replication journal volume assignment process is commenced by the management nodes 170 when a new SDR module 340 is added to the replication component layer 320 (block 500).

As an initial step of the replication journal assignment process, the replication volume manager module 172 will send request to one or more target storage control systems of the storage nodes to allocate a new replication journal volume for the new SDR module (block 501). In some embodiments, to generate a new replication journal volume, the replication volume manager module 172 utilizes the same system interfaces of the data storage system which are used to create user data volumes. In some embodiments, the capacity for the new replication journal volume is assigned out of the total capacity which is dedicated to the journal-based asynchronous replication system for maintaining and managing replication journals. The total replication journal capacity can be defined by a user, or such total capacity can be reserved automatically by the system. In certain instances, it is possible that the total storage capacity dedicated to the replication journals is fully utilized such that the data storage system will not be able to satisfy the request by the replication volume manager module 172 to allocate storage capacity for a new replication journal volume. In such instances, if there is no available capacity to allocate for a new replication journal volume (negative result in block 502), the new replication journal volume will not be generated and assigned to the new replication component (block 503) and the new replication component will not be assigned replication workload.

On the other hand, if there is available capacity to allocate for a new replication journal volume (affirmative result in block 502), the new replication journal volume will be generated and assigned to the new replication component (block 504). Once the new replication component is assigned a replication journal volume and is ready to participate the distributed asynchronous replication process, management nodes will assign the new replication component a portion (e.g., block) of a given user volume (e.g., a replicated volume) to handle the I/O replication workload associated with the assigned portion of the user volume (block 505). The data distribution function of the distribution layer is modified (e.g., via operation of the metadata manager module 176, FIG. 1A) based on the new replication workload assignment to the new replication component (block 506).

In response to the change in the data distribution due to the addition of the new replication component, a barrier will be generated (e.g., via operation of the journal barrier manager module 174, FIG. 1A) to close the current barrier journal and open a new barrier journal (block 507). The closing of the current barrier journal and the opening of the new barrier journal ensures that the I/O data for the specific block of the given user volume, which is assigned to the new replication component, is recorded by the new replication component under the new barrier journal. Once the new replication component begins processing I/O operations for the assigned portion/block of the user volume, the I/O operations will be recorded in the new barrier journal. In other words, when the barrier is generated, the barrier represents a stop point for the current data collection intervals of the replication workloads performed by the associated replication components for the given user volume, and new data collection intervals (e.g., new barrier journals) begin for each of the replication components handling the replication workloads for the given user volume. In this regard, in response to the barrier commend being issued/generated, a new barrier-interval would begin for the replication journal of each replication component handling the I/O replication workload for the given user volume.

Figure 6:
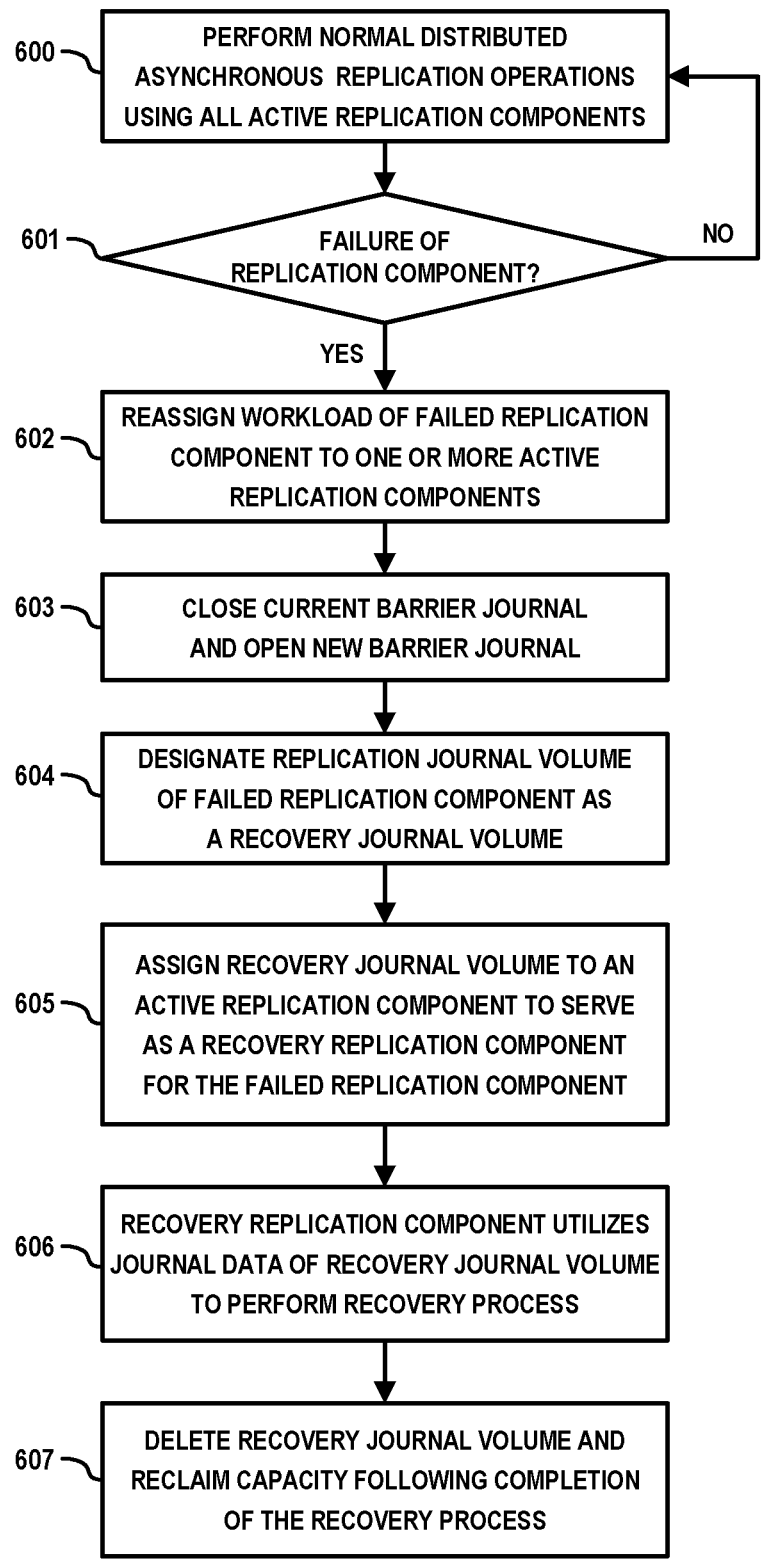
FIG. 6 illustrates a flow diagram of a method for performing a journal recovery process in response to failure of a replication component in a distributed replication system, according to an exemplary embodiment of the disclosure.

FIG. 6 illustrates a flow diagram of a method for performing a journal recovery process in response to failure of a replication component in a distributed replication system, according to an exemplary embodiment of the disclosure. During normal operation of the distributed replication system, all active replication components perform asynchronous replication operations using their assigned replication journal volumes (block 600). For example, as noted above, during normal operations, the distribution layer (in a given source storage node) distributes I/O operations for replicated user volumes to the proper replication components in the replication layer according to a current distribution function (e.g., current distribution instance) that was sent to distribution layer (of the given source storage node) from the MDM module.

On a source storage node, the replication components perform functions such as handling replication I/O operations, adding metadata and the actual I/O data associated with the replication I/O operations to respective barrier journals, and transmitting the barrier journals to destination storage nodes. On a destination node, the distribution layer distributes received barrier journals to corresponding replication components, and the replication components utilize the barrier journal data to perform asynchronous data replication operations which include storing replicated data in replication volumes of the destination storage node. The distribution layers in the source and destination nodes can change at any time, wherein each distribution instance has its own unique monotonically increasing distribution ID.

As noted above, a journal-based replication system according to an exemplary embodiment of the disclosure holds the changes introduced by the application in a source replication journal, wherein each change comprises (i) metadata (e.g., the address of the change in the volume (source volume or replica volume), and (ii) the user data (e.g., the actual user data (new data or updated data). Using multiple non-atomic operations to perform the replicated I/O means that a failure may occur between any non-atomic operations. Nevertheless, the replication solution must still guarantee the write order fidelity of the target image. In some embodiments, the following order of operations is performed by a given replication component (e.g., SDR module) to preserve write order fidelity in the face of failures/crashes between operations.

For example, a replication component writes to a barrier journal (in its assigned replication journal volume) the metadata and the user data in a manner which preserves write order fidelity at a target node and, thus, allows a consistent replicated image to be generated at the target node. More specifically, in some embodiments, when a replication component writes to a barrier journal, the order of operations are as follows: (i) metadata is first written to the barrier journal (before writing data to the user volume), wherein the metadata specifies a location in the given volume where the new/updated data will be stored; (ii) the user data is written to the user volume (after the metadata is written to the barrier journal); and (iii) the user data is written to the replication journal volume (after the data is written to the user volume).

The metadata is saved in the barrier journal before the user data is written to the user volume, which ensures that the replication has an indication of the write operation (of the user data) even if a failure occurs right after the user data is written to the underlying storage. Otherwise, the write operation may occur in the user volume but the process may crash preventing the associated metadata from being written to the barrier journal. This crash would leave the replication system with a change (written data) that is not "documented" and will never be transmitted. Moreover, the user data is written to the replication journal volume after writing the data to the source user volume, to ensure that if the write to the user volume fails, the replication will not transmit the user data (in the replication journal volume) to the destination system which was not written in source user volume.

By implementing this order of write operations (e.g., metadata-to-replication journal volume, user data-to-user volume, and user data-to-replication journal volume), recovery can be performed to recover from a crash which occurs at some point in time between writing the metadata to the replication journal volume and the completion of the write of the user data to the replication journal volume, while preserving write-order fidelity. The recovery is carried out when the replication system transmits changes for which the metadata exists in the replication journal but the corresponding user data does not exist in the replication journal. When missing user data is discovered, the relevant user data is instead read from the user volume in the source. This ensures that whether the crash took place before or after the data was written to the underlying storage, the target image ends up with the same image as the source.

It is to be noted that the data written by the replication component to the journal may be source data to be transmitted to a destination node, or data received by a destination node from a source node. Each replication component maintains and follows the same rules for writing, transmitting and applying journal data to ensure write order fidelity and maintaining consistency between source and replicated volumes in the event of replication component failure. A given replication journal volume can only be accessed by the replication component which is assigned to given replication journal volume. Such access control can be either policed, e.g., by the storage system, or can be by agreement between the replication components.

If the free capacity for a given replication journal volume is getting low, the replication component can request the replication volume manager 172 (FIG. 1A) to increase the capacity of the replication journal volume. The replication volume manager 172 can utilize existing volume management tools and APIs of the storage system to try and increase the size of the given replication journal volume, as requested by the replication component. It is possible that the total capacity dedicated to the replication journal volumes is fully utilized or that the storage system will not be able to satisfy the request replication volume manager 172. In such instance, the size of the given replication journal volume will not be increased.

The normal operations of the distributed replication system will continue as discussed above during times when no replication component has failed (negative result in block 601) and all replication components are active and properly functioning. However, in instances where it is determined that a given replication component has failed (affirmative result in block 601), a recovery operation is performed to recover journal data in the replication journal volume of the failed replication component. The recovery process allows the asynchronization replication process to continue while ensuring that a consistent replica image is generated in a replicated volume maintained on a replica storage node. A given replication component may be a source replication component for a given replication consistency group, and a destination replication component for some other replication consistency group. As such, the replication journal volume assigned to a failed replication component may contain source data and target data, wherein both source data and target data should be recovered to properly continue the replication operations (e.g., source data must be transmitted to a target destination node, and the target data must be properly applied to the target replicated volumes to generate a consistent replica image).

To begin the recovery process, an initial operation comprises reassigning the replication workload, which was previously assigned to the failed replication component, to one or more active replication components (block 602). In some embodiments, this process is performed by the metadata manager module 176 (FIG. 1A) by changing the data distribution function of the distribution layer in the replication source node or the replication destination node, depending on whether the failed replication component resides in the source node or the destination node. In some embodiments, the change in the distribution function is performed over the closing of a current barrier journal and the opening of a new barrier journal (via generation of a barrier) to thereby maintain write order consistency (block 603).

For example, in some embodiments, a change in the distribution layer of a source node is performed as follows. The metadata manager module 176 generates a new distribution instance D with a unique distribution ID which is higher that the unique distribution ID of the current instance being used by the distribution layer. The metadata manager module 176 notifies the active replication components in the replication layer of the new distribution ID of the new distribution instance. In response to receiving the new distribution ID of the new distribution instance, each replication component begins to validate incoming replication I/O requests received by the replication component from the distribution layer. In some embodiments, a validation process comprises the replication component comparing the distribution ID of a given replication I/O request (received from the distribution layer) against the new distribution ID of the new distribution instance, and failing those received replication I/O requests having a distribution ID which does not match the new distribution ID of the new distribution instance, as received from the metadata manager.

Furthermore, the metadata manager module commands all the replication components to close the current barrier journal and open a new barrier journal. In response to such command, each replication component opens a new respective journal barrier to store journal data for replication I/O requests received by the replication component with the proper distribution ID. As noted above, a replication component will create a journal record for a given replication I/O request that is received by the replication component (from the distribution layer), wherein the journal record comprises the user data and the storage location (offset) in the volume. If there already exists a current journal record for a given address (e.g., storage location in a user volume) in the associated (and currently open) barrier journal of the replication component, the existing journal record will be replaced by the new journal record (e.g., write folding). Otherwise, the new journal record is added to the barrier journal.

Referring back to FIG. 6, the replication journal volume associated with the failed replication component is designated as a recovery journal volume (block 604). The recovery journal volume is assigned to an active replication component, wherein the active replication component is designated as a recovery replication component to operate on behalf of the failed replication component (block 605). In some embodiments, such designations and assignment are performed by the replication volume manager 172 (FIG. 1A). The designated recovery replication component is tasked with handling the recovery of the journal data from the recovery journal volume to continue asynchronous replications operations despite the failed replication component. It is to be noted that the designated recovery replication component can also function as a regular replication component using its assigned replication journal volume to continue performing regular replication component functions (e.g., handle replication I/O requests, and record I/O operations in a corresponding barrier journal, etc.) while the designated recovery replication component reads and transmits the journal data from the recovery journal volume.

The designated recovery replication component will proceed to access the recovery replication journal volume, read the journal data, and perform a recovery process to recover the journal data of the failed replication component (block 606). For example, to recover destination data, the designated recovery replication component will apply the journal data of a given barrier journal to the associated portion of the replica volume to replicate the user data, when the metadata manager indicates that the given barrier journal can be applied. On the other hand, to recover source data, the designated recovery replication component transmits the source journal data to a target destination node according to a barrier order as specified by the barrier journal IDs of non-transmitted barrier journals in the recovery replication volume.

Moreover, by way of example, the destination replication component which receives the recovered journal data may obtain some data for a given address block X from the recovery replication component, and other data for the same address block X from another replication component to which the given address block X was assigned following the failure of the replication component. The receiving replication component will order the data according to barrier journal IDs, which creates a clear order between the updates sent for the address block X from different source replication components. The receiving replication component applies the journal data in barrier order. The separation by barriers ensures clear ordering between replication I/O operations, and allows the designated recovery replication component to perform the recovery and transmit the data without halting the normal asynchronous replication I/O flow.

Furthermore, the recovery journal volume may include some metadata updates which do not have the corresponding write data. This may occur when the replication component failed before completion of the write operation when writing the user data to the replication journal volume. In this instance, the designed recovery replication component will read the block data from the user volume and assigns the barrier an inconsistency (IC) interval, that is the barrier ID where the data is consistent. The IC interval is utilized by the destination node to identify a consistent barrier.

When the recovery process is complete, the recovery journal volume is deleted and the capacity of the deleted recovery journal volume is reclaimed (block 607). For example, once all the relevant journal data of the recovery journal volume of the source node has been read and successfully transmitted to the destination node, the replication volume manager module 172 (FIG. 1A) will delete the recovery journal volume and reclaim the journal capacity.

The exemplary process flow of FIG. 6 illustrates a replication journal recovery process which is implemented in instances where a failed replication component is not revived/restored during the recovery process. In other embodiments, a failed replication component may have temporary failure in which the replication component is inactive for a short period of time, and is revived/restored during the replication journal recovery process. When a failed replication component is revived/restored, in some embodiments, the revived/restored replication component can be configured to assist in the replication journal recovery process. For example, FIG. 7 illustrates a flow diagram of a method for performing a journal recovery process upon restoring of a failed replication component in a distributed replication system, according to an exemplary embodiment of the disclosure.

Figure 7:
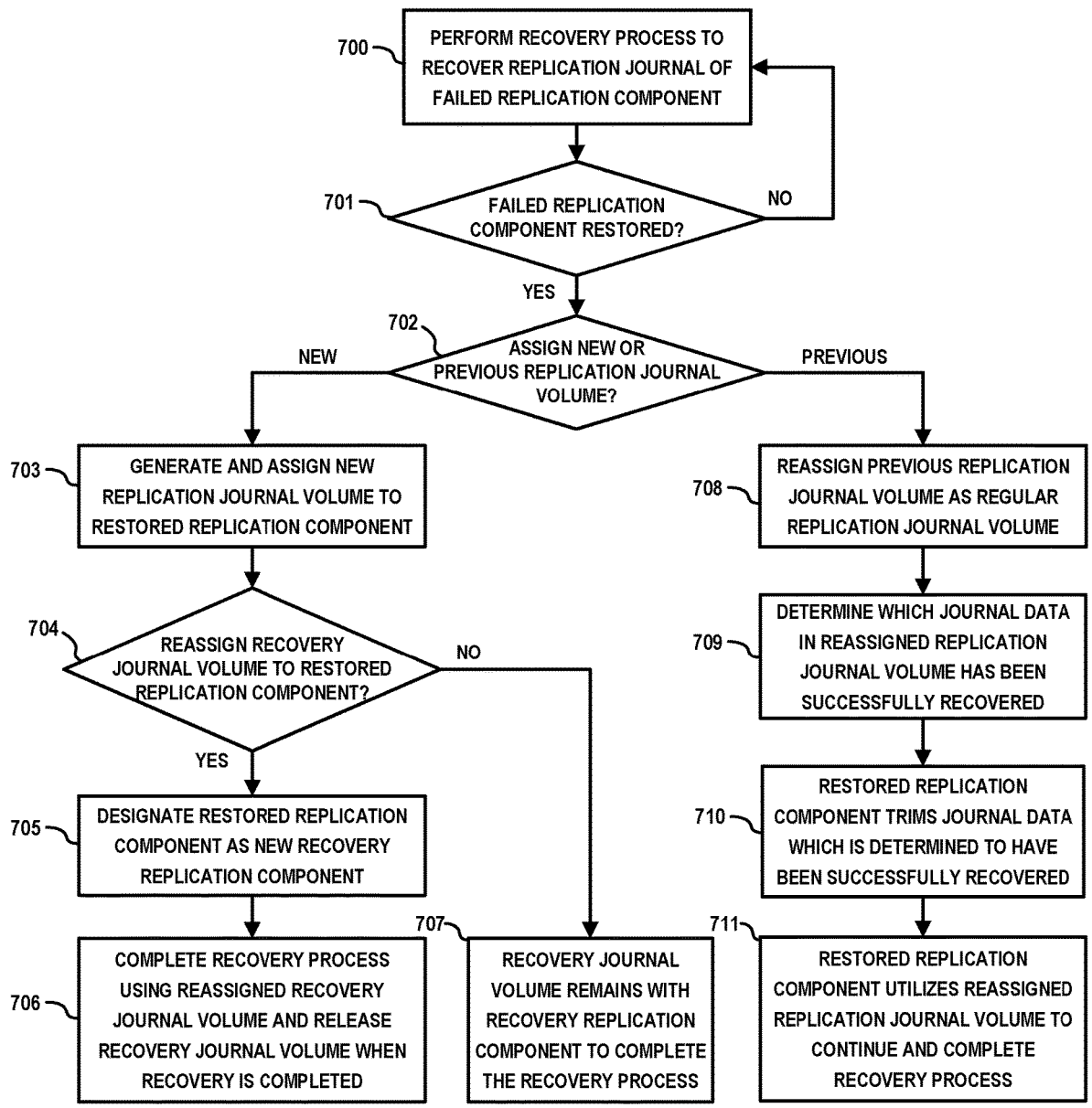
FIG. 7 illustrates a flow diagram of a method for performing a journal recovery process upon restoring a failed replication component in a distributed replication system, according to an exemplary embodiment of the disclosure.

Referring to FIG. 7, a recovery process is performed to recover a replication journal of a failed replication component (block 700). For example, the recovery process can be implemented using the methods discussed above in conjunction with FIG. 6. During the recovery process, the failed replication component may be restored (affirmative result in block 701). Depending on the configuration of the recovery process, a new replication journal volume can be assigned to the restored replication component, or the previous replication journal can be assigned backed to the restored replication components (decision block 702). If it is determined that a new replication journal volume is to be assigned to the restored replication component, the process flow continues to create and assign a new replication journal volume to the restored replication component (block 703). In some embodiments, the new replication journal volume is created and assigned using the process of FIG. 5 as discussed above. Thereafter, a data distribution change is performed in the distribution layer to assign replication workload to the restored replication component, and a new barrier journal is opened, thereby enabling the restored replication component to begin processing replication I/O requests and recording journal data in the newly assigned replication journal volume.

Furthermore, depending on the configuration of the recovery process, the recovery journal volume may or may not be reassigned back to the restored replication component (decision block 704). In some embodiments, for purposes of load balancing, the recovery journal volume is reassigned back to the restored replication component (affirmative decision in block 704), in which case the restored replication component is essentially designed as the new recovery replication component (block 705) to take over the recovery process for recovering the journal data. The restored replication component will utilize the journal data in the recovery journal volume to complete the recovery process, and the recovery journal volume will be deleted and its capacity is released following completion of the recovery process (block 706). This process provides balancing of the transmission load (e.g., transmitting the journal data to a destination node) for the recovery process in instances where, for example, the originally designated recovery replication component has journal data in its replication journal volume to transmit, while the restored replication components may have no or a relatively small amount of journal data in its newly assigned replication journal volume to transmit or process to perform an asynchronous replication operation.

On the other hand, if the recovery process is configured such that that the recovery journal volume is not reassigned back to the restored replication component (negative decision in block 704), the recovery journal volume will remain with the originally designated recovery replication component to complete the journal data recovery process (block 707). The recovery journal volume will be deleted and its capacity is released following completion of the recovery process.

Referring back to the decision block 702, if it is determined that the previous replication journal (which is currently designated as the recovery journal volume) is to be reassigned back to the restored replication component, the process flow continues to assign the previous replication journal back to the restored replication component, in which case the recovery journal volume is designated as a regular replication journal volume which is used by the restored replication component to (i) complete the recovery process and to (ii) store new journal data for a current barrier journal (block 708). The restored replication component will determine which journal data in the reassigned replication journal volume has already been successfully recovered (e.g., successfully transmitted/processed) as part of the recovery process (block 709). In some embodiments, this determination is made by the originally designated recovery replication component informing the restored replication component which journal data in the recovery journal volume has been successfully recovered, and which journal data has not yet been successfully recovered.

The restored replication component will trim portions of the reassigned replication journal volume (e.g., trim the journal data) which are determined to have been successfully recovered (block 710). The restored replication component will utilize the reassigned replication journal volume to complete the recovery process by transmitting/processing existing journal data (block 711) and for writing new journal data for a current barrier journal in the reassigned replication journal volume. This process provides load balancing as discussed above where the restored replication component is configured to complete the recovery process of the remaining journal data in the previous replication journal, while further enhancing the recovery process by allowing the restored replication component to use the previous replication journal as a new journal for writing new data. Indeed, this process eliminates need to create a new replication journal volume and release the capacity of the recovery journal.

Figure 8:
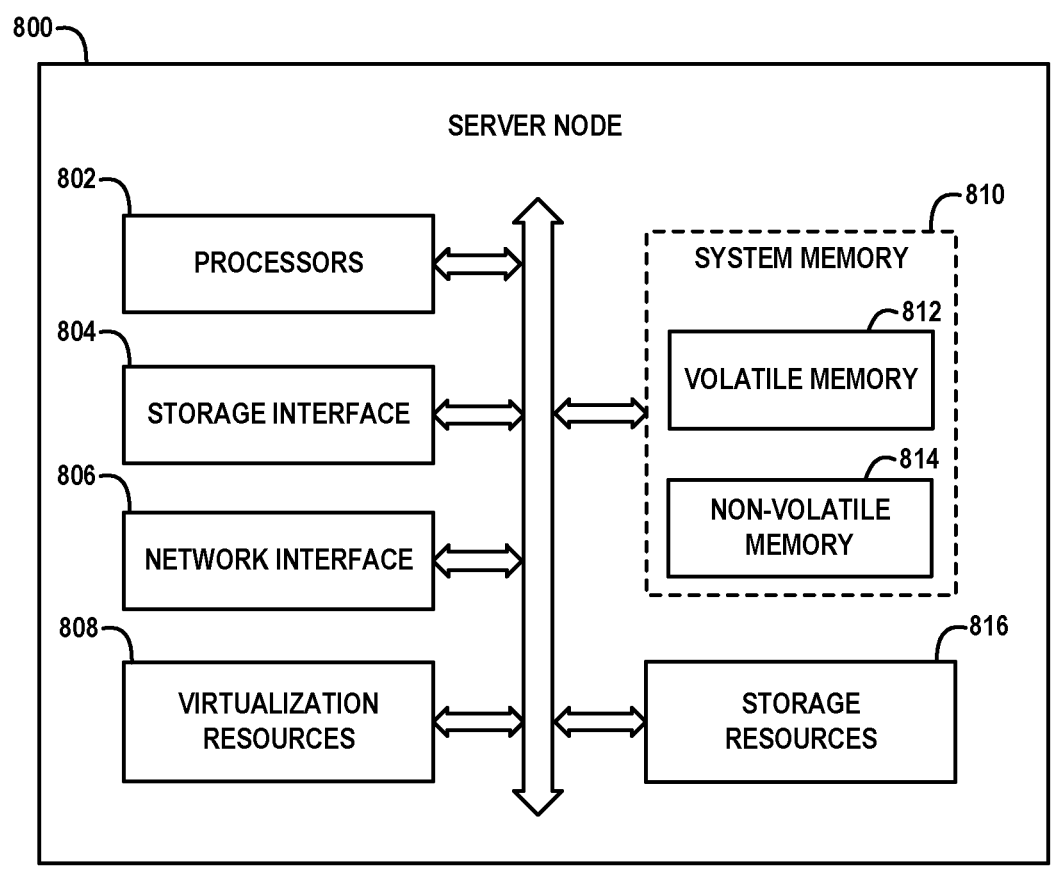
FIG. 8 schematically illustrates a framework of a server node for hosting a data replication system according to an exemplary embodiment of the disclosure.

FIG. 8 schematically illustrates a framework of a server node 800 for hosting a data replication system according to an exemplary embodiment of the disclosure. The server node 800 comprises processors 802, storage interface circuitry 804, network interface circuitry 806, virtualization resources 808, system memory 810, and storage resources 816. The system memory 810 comprises volatile memory 812 and non-volatile memory 814. The processors 802 comprise one or more types of hardware processors that are configured to process program instructions and data to execute a native operating system (OS) and applications that run on the server node 800.

For example, the processors 802 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligence (AI) accelerators, and other types of specialized processors or coprocessors that are configured to execute one or more fixed functions.

The storage interface circuitry 804 enables the processors 802 to interface and communicate with the system memory 810, the storage resources 816, and other local storage and off-infrastructure storage media, using one or more standard communication and/or storage control protocols to read data from or write data to volatile and non-volatile memory/storage devices. Such protocols include, but are not limited to, NVMe, PCIe, PATA, SATA, SAS, Fibre Channel, etc. The network interface circuitry 806 enables the server node 800 to interface and communicate with a network and other system components. The network interface circuitry 806 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 808 can be instantiated to execute one or more services or functions which are hosted by the server node 800. For example, the virtualization resources 808 can be configured to implement the various modules and functionalities of a host connectivity management system as discussed herein. In one embodiment, the virtualization resources 808 comprise virtual machines that are implemented using a hypervisor platform which executes on the server node 800, wherein one or more virtual machines can be instantiated to execute functions of the server node 800. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the server node 800, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. The underlying physical infrastructure may comprise one or more commercially available distributed processing platforms which are suitable for the target application.

In another embodiment, the virtualization resources 808 comprise containers such as Docker containers or other types of Linux containers (LXCs). As is known in the art, in a container-based application framework, each application container comprises a separate application and associated dependencies and other components to provide a complete filesystem, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the server node 800 as well execute one or more of the various modules and functionalities of a storage control system as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In some embodiments, the constituent components and modules of the storage nodes 140, 200 and the management nodes 170 (FIGS. 1A, 1B, 2) are implemented using program code that is loaded into the system memory 810 (e.g., volatile memory 812), and executed by the processors 802 to perform respective functions as described herein. In this regard, the system memory 810, the storage resources 816, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 810 comprises various types of memory such as volatile RAM, NVRAM, or other types of memory, in any combination. The volatile memory 812 may be a dynamic random-access memory (DRAM) (e.g., DRAM DIMM (Dual In-line Memory Module), or other forms of volatile RAM. The non-volatile memory 814 may comprise one or more of NAND Flash storage devices, SSD devices, or other types of next generation non-volatile memory (NGNVM) devices. The system memory 810 can be implemented using a hierarchical memory tier structure wherein the volatile system memory 812 is configured as the highest-level memory tier, and the non-volatile system memory 814 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 802 to execute a native operating system and one or more applications or processes hosted by the server node 800, and to temporarily store data that is utilized and/or generated by the native OS and application programs and processes running on the server node 800. The storage resources 816 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:

controlling, by a data replication system, data replication operations performed on a storage node of a data storage system, wherein the data replication system comprises a replication component layer comprising a plurality of replication components operating on the storage node, and a distribution layer operating on the storage node and configured to distribute a replication workload among the plurality of replication components, wherein controlling the data replication operations comprises:

assigning, by the data replication system, an associated replication journal volume to each replication component of the plurality of replication components operating on the storage node, wherein each replication component operating on the storage node is (i) assigned to handle a respective portion of a replication workload associated with replication input/output (I/O) requests directed to logical addresses which correspond to a respective block of logical addresses of a storage volume, and (ii) configured to write journal data, which is associated with I/O write operations handled by the replication component in response to the replication I/O requests, in the associated replication journal volume of the replication component;

distributing, by the distribution layer, the replication workload among the plurality of replication components by directing the replication I/O requests to respective replication components which are assigned to handle the replication workload associated with the respective logical addresses of the replication I/O requests; and in response to detecting a failed replication component of the plurality of replication components, performing, by the data replication system, a recovery process which comprises:

designating at least one replication component of the plurality of replication components as a recovery replication component;

designating the associated replication journal volume of the failed replication component as a recovery journal volume; and assigning the recovery journal volume to the recovery replication component to enable the recovery replication component to recover journal data in the recovery journal volume.

2. The method of claim 1, wherein the recovery process further comprises:

reassigning the portion of the replication workload handled by the failed replication component to one or more replication components of the plurality of replication components;

generating a journal barrier to (i) close an associated current barrier journal of each replication component of the plurality of replication components and to (ii) open an associated new barrier journal of each replication component of the plurality of replication components; and enabling the replication components to write new journal data associated with new I/O write operations performed by the replication components in the associated new barrier journals.

3. The method of claim 1, wherein the recovery process further comprises:

deleting the recovery journal volume after completion of the recovery process; and reclaiming storage capacity of the deleted recovery journal volume.

4. The method of claim 1, further comprising, in response to determining that the failed replication component has been restored, generating and assigning a new associated replication journal to the restored replication component.

5. The method of claim 1, further comprising:

in response to determining that the failed replication component has been restored before completion of the recovery process:

generating and assigning a new associated replication journal to the restored replication component;

enabling the restored replication component to write new journal data, which is associated with new I/O write operations performed by the restored replication component, into the new associated replication journal;

maintaining the recovery journal volume assignment to the recovery replication component to enable the recovery replication component to recover the journal data in the recovery journal volume and complete the recovery process; and deleting the recovery journal volume and reclaiming storage capacity of the deleted recovery journal volume, after completion of the recovery process.

6. The method of claim 1, further comprising:

in response to determining that the failed replication component has been restored before completion of the recovery process:

generating and assigning a new associated replication journal to the restored replication component;

enabling the restored replication component to write new journal data, which is associated with new I/O write operations performed by the restored replication component, into the new associated replication journal;

reassigning the recovery journal volume to the restored replication component to enable the restored replication component to recover remaining journal data in the recovery journal volume and complete the recovery process; and deleting the recovery journal volume and reclaiming storage capacity of the deleted recovery journal volume, after completion of the recovery process.

7. The method of claim 1, further comprising:

in response to determining that the failed replication component has been restored before completion of the recovery process:

reassigning the recovery journal volume to the restored replication component to enable the restored replication component to recover remaining journal data in the recovery journal volume and complete the recovery process; and enabling the restored replication component to utilize the recovery journal volume as a replication journal volume to write new journal data associated with new I/O write operations performed by the restored replication component.

8. An article of manufacture comprising a non-transitory processor-readable storage medium having stored therein program code of one or more software programs, wherein the program code is executable by one or more processors to implement a method which comprises:

controlling, by a data replication system, data replication operations performed on a storage node of a data storage system, wherein the data replication system comprises a replication component layer comprising a plurality of replication components operating on the storage node, and a distribution layer operating on the storage node and configured to distribute a replication workload among the plurality of replication components, wherein controlling the data replication operations comprises:

assigning, by the data replication system, an associated replication journal volume to each replication component of the plurality of replication components operating on the storage node, wherein each replication component operating on the storage node is (i) assigned to handle a respective portion of a replication workload associated with replication input/output (I/O) requests directed to logical addresses which correspond to a respective block of logical addresses of a storage volume, and (ii) configured to write journal data, which is associated with I/O write operations handled by the replication component in response to the replication I/O requests, in the associated replication journal volume of the replication component;

distributing, by the distribution layer, the replication workload among the plurality of replication components by directing the replication I/O requests to respective replication components which are assigned to handle the replication workload associated with the respective logical addresses of the replication I/O requests; and in response to detecting a failed replication component of the plurality of replication components, performing, by the data replication system, a recovery process which comprises:

designating at least one replication component of the plurality of replication components as a recovery replication component;

designating the associated replication journal volume of the failed replication component as a recovery journal volume; and assigning the recovery journal volume to the recovery replication component to enable the recovery replication component to recover journal data in the recovery journal volume.

9. The article of manufacture of claim 8, wherein the program code for performing the recovery process further comprises program code for:

reassigning the portion of the replication workload handled by the failed replication component to one or more replication components of the plurality of replication components;

generating a journal barrier to (i) close an associated current barrier journal of each replication component of the plurality of replication components and to (ii) open an associated new barrier journal of each replication component of the plurality of replication components; and enabling the replication components to write new journal data associated with new I/O write operations performed by the replication components in the associated new barrier journals.

10. The article of manufacture of claim 8, wherein the program code for performing the recovery process further comprises program code for:

deleting the recovery journal volume after completion of the recovery process; and reclaiming storage capacity of the deleted recovery journal volume.

11. The article of manufacture of claim 8, further comprising program code for, in response to determining that the failed replication component has been restored, generating and assigning a new associated replication journal to the restored replication component.

12. The article of manufacture of claim 8, further comprising program code for:

in response to determining that the failed replication component has been restored before completion of the recovery process:

generating and assigning a new associated replication journal to the restored replication component;

enabling the restored replication component to write new journal data, which is associated with new I/O write performed by the restored replication component, into the new associated replication journal;

maintaining the recovery journal volume assignment to the recovery replication component to enable the recovery replication component to recover the journal data in the recovery journal volume and complete the recovery process; and deleting the recovery journal volume and reclaiming storage capacity of the deleted recovery journal volume, after completion of the recovery process.

13. The article of manufacture of claim 8, further comprising program code for:

in response to determining that the failed replication component has been restored before completion of the recovery process:

generating and assigning a new associated replication journal to the restored replication component;

enabling the restored replication component to write new journal data, which is associated with new I/O write operations performed by the restored replication component, into the new associated replication journal;

reassigning the recovery journal volume to the restored replication component to enable the restored replication component to recover remaining journal data in the recovery journal volume and complete the recovery process; and deleting the recovery journal volume and reclaiming storage capacity of the deleted recovery journal volume, after completion of the recovery process.

14. The article of manufacture of claim 8, further comprising program code for:

in response to determining that the failed replication component has been restored before completion of the recovery process:

reassigning the recovery journal volume to the restored replication component to enable the restored replication component to recover remaining journal data in the recovery journal volume and complete the recovery process; and enabling the restored replication component to utilize the recovery journal volume as a replication journal volume to write new journal data associated with new I/O write operations performed by the restored replication component.

15. A system, comprising:
a data storage system comprising a cluster of storage nodes;
a data replication system implemented by the data storage system, wherein the data replication system is configured to control data replication operations performed on a given storage node of the cluster of storage nodes, wherein the data replication system comprises a replication component layer comprising a plurality of replication components operating on the given storage node, and a distribution layer operating on the given storage node and configured to distribute a replication workload among the plurality of replication components operating on the given storage node, wherein in controlling the data replication operations on the given storage node, the data replication system is configured to:
assign an associated replication journal volume to each replication component of the plurality of replication components operating on the given storage node, wherein each replication component operating on the given storage node is (i) assigned to handle a respective portion of a replication workload associated with replication input/output (I/O) requests directed to logical addresses which correspond to a respective block of logical addresses of a storage volume, and (ii) configured to write journal data, which is associated with I/O write operations handled by the replication component in response to the replication I/O requests, in the associated replication journal volume of the replication component;
distribute, by the distribution layer, the replication workload among the plurality of replication components by directing the replication I/O requests to respective replication components which are assigned to handle the replication workload associated with the respective logical addresses of the replication I/O requests; and
perform a recovery process in response to detecting a failed replication component of the plurality of replication components, wherein in performing the recovery process, the data replication system is configured to:
designate at least one replication component of the plurality of replication components as a recovery replication component;
designate the associated replication journal volume of the failed replication component as a recovery journal volume; and
assign the recovery journal volume to the recovery replication component to enable the recovery replication component to recover journal data in the recovery journal volume.

16. The system of claim 15, wherein in performing the recovery process, the data replication system is configured to:
delete the recovery journal volume after completion of the recovery process; and
reclaim storage capacity of the deleted recovery journal volume.

17. The system of claim 15, wherein, in response to determining that the failed replication component has been restored, the data replication system is further configured to generate and assign a new associated replication journal to the restored replication component.

18. The system of claim 15, wherein, in response to determining that the failed replication component has been restored before completion of the recovery process, the data replication system is further configured to:
generate and assign a new associated replication journal to the restored replication component;
enable the restored replication component to write new journal data, which is associated with new I/O write operations performed by the restored replication component, into the new associated replication journal;
maintain the recovery journal volume assignment to the recovery replication component to enable the recovery replication component to recover the journal data in the recovery journal volume and complete the recovery process; and
delete the recovery journal volume and reclaiming storage capacity of the deleted recovery journal volume, after completion of the recovery process.

19. The system of claim 15, wherein, in response to determining that the failed replication component has been restored before completion of the recovery process, the data replication system is further configured to:
generate and assign a new associated replication journal to the restored replication component;
enable the restored replication component to write new journal data, which is associated with new I/O write operations performed by the restored replication component, into the new associated replication journal;
reassign the recovery journal volume to the restored replication component to enable the restored replication component to recover remaining journal data in the recovery journal volume and complete the recovery process; and
delete the recovery journal volume and reclaiming storage capacity of the deleted recovery journal volume, after completion of the recovery process.

20. The system of claim 15, wherein, in response to determining that the failed replication component has been restored before completion of the recovery process, the data replication system is further configured to:
reassign the recovery journal volume to the restored replication component to enable the restored replication component to recover remaining journal data in the recovery journal volume and complete the recovery process; and
enable the restored replication component to utilize the recovery journal volume as an associated replication journal volume to write new journal data associated with new I/O write operations performed by the restored replication component.

\* \* \* \* \*